US010321378B2

(12) United States Patent
Xu et al.

(10) Patent No.: US 10,321,378 B2
(45) Date of Patent: Jun. 11, 2019

(54) DEVICE AND METHOD IN WIRELESS COMMUNICATION SYSTEM

(71) Applicant: SONY CORPORATION, Tokyo (JP)

(72) Inventors: Xiaodong Xu, Beijing (CN); Cuibo Yu, Beijing (CN); Yateng Hong, Beijing (CN); Ya Liu, Beijing (CN); Cong Zheng, Beijing (CN); Liyao Wei, Beijing (CN); Xiaojia Song, Beijing (CN); Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/889,252

(22) PCT Filed: May 30, 2014

(86) PCT No.: PCT/CN2014/078950
§ 371 (c)(1),
(2) Date: Nov. 5, 2015

(87) PCT Pub. No.: WO2014/194796
PCT Pub. Date: Dec. 11, 2014

(65) Prior Publication Data
US 2016/0081001 A1    Mar. 17, 2016

(30) Foreign Application Priority Data

Jun. 3, 2013    (CN) .......................... 2013 1 0216858

(51) Int. Cl.
*H04W 80/04*    (2009.01)
*H04W 36/32*    (2009.01)
(Continued)

(52) U.S. Cl.
CPC .......... *H04W 36/32* (2013.01); *H04W 36/04* (2013.01); *H04W 36/24* (2013.01); *H04W 48/20* (2013.01); *H04W 84/045* (2013.01)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS 8,725,153 B2 * 5/2014 Dimou .............. H04W 36/0083
455/423
8,983,470 B1 * 3/2015 Ryan .................... H04W 24/02
455/422.1
(Continued)

FOREIGN PATENT DOCUMENTS

CN    102761887 A    10/2012
CN    102905284 A    1/2013
CN    102905324 A    1/2013

OTHER PUBLICATIONS

International Search Report dated Aug. 13, 2014, in PCT/CN2014/078950 filed May 30, 2014.
(Continued)

*Primary Examiner* — Marcus Smith
*Assistant Examiner* — Prenell P Jones
(74) *Attorney, Agent, or Firm* — Xsensus LLP

(57) ABSTRACT

A system that determines a cell density and cell type in an area corresponding to a location of a user equipment; determines a mobility state of the user equipment based on the determined cell density and the determined cell type; and controls cell reselection for the user equipment based on the determined mobility state of the user equipment.

17 Claims, 10 Drawing Sheets

(51) Int. Cl.
*H04W 48/20* (2009.01)
*H04W 36/04* (2009.01)
*H04W 36/24* (2009.01)
*H04W 84/04* (2009.01)

(56) References Cited

U.S. PATENT DOCUMENTS

| | | | | |
|---|---|---|---|---|
| 9,161,298 | B2* | 10/2015 | Somasundaram | H04J 11/0093 |
| 2004/0116110 | A1* | 6/2004 | Amerga | H04W 48/16 455/422.1 |
| 2005/0239478 | A1* | 10/2005 | Spirito | H04W 64/00 455/456.1 |
| 2007/0093213 | A1* | 4/2007 | Filizola | G01R 29/0814 455/67.16 |
| 2007/0133456 | A1* | 6/2007 | Ding | H04W 72/005 370/328 |
| 2008/0039089 | A1* | 2/2008 | Berkman | H04W 36/04 455/436 |
| 2009/0135784 | A1* | 5/2009 | Horn | H04W 36/0055 370/331 |
| 2009/0323549 | A1* | 12/2009 | Jerbi | G08G 1/0104 370/252 |
| 2011/0026484 | A1* | 2/2011 | Fox | H04W 60/00 370/331 |
| 2011/0306375 | A1* | 12/2011 | Chandra | H04W 24/00 455/509 |
| 2012/0093051 | A1* | 4/2012 | Xu | H04L 12/1895 370/311 |
| 2013/0162480 | A1* | 6/2013 | Gander | G01S 5/0273 342/387 |
| 2013/0303231 | A1* | 11/2013 | Yiu | H04W 76/048 455/525 |
| 2013/0324114 | A1* | 12/2013 | Raghothaman | H04W 76/023 455/426.1 |
| 2014/0066074 | A1* | 3/2014 | Folke | H04W 36/08 455/437 |
| 2014/0141785 | A1 | 5/2014 | Wang et al. | |
| 2014/0192781 | A1* | 7/2014 | Teyeb | H04W 36/34 370/331 |
| 2014/0220973 | A1* | 8/2014 | Lunden | H04W 36/32 455/436 |
| 2014/0220979 | A1* | 8/2014 | Song | H04W 36/0083 455/436 |
| 2014/0274062 | A1* | 9/2014 | Centonza | H04W 24/10 455/437 |
| 2015/0045031 | A1* | 2/2015 | Kaikkonen | H04W 36/32 455/436 |
| 2016/0050610 | A1* | 2/2016 | Somasundaram | H04J 11/0093 455/436 |
| 2018/0227824 | A1* | 8/2018 | Chen | H04W 36/04 |

OTHER PUBLICATIONS

Written Opinion of the International Searching Authority dated Aug. 13, 2014, in PCT/CN2014/078950 filed May 30, 2014.

* cited by examiner

DEVICE AND METHOD IN WIRELESS COMMUNICATION SYSTEM

FIELD OF INVENTION

The present invention relates generally to the field of wireless communication, and more particularly to a device and a method in Universal Mobile Telecommunications System (UMTS) Long Term Evolution (LTE) and its enhancement (LTE-A).

BACKGROUND OF INVENTION

LTE supports high-speed train scenarios with a maximum speed of 350 km/h. In order to ensure quality of service for mobile terminals in different mobility states, LTE is not only optimized accordingly in the network structure, but also designed with a corresponding mechanism which enables a mobile terminal to adaptively optimize the parameter configuration to comply with the requirements in different scenarios according to its current mobility state.

The above mechanism is mobility state estimation (MSE) for a mobile terminal in LTE. Mobility state estimation for a mobile terminal in LTE is based on the count of number of times of cell reselection. In a conventional homogeneous network, the above mobility state estimation based on the count of number of times of cell reselection can provide a relatively accurate estimation of the mobility state of the mobile terminal. However, with the introduction of heterogeneous network, the randomness of small cell deployment positions and the nonuniformity of coverages will greatly affect the accuracy of the above mobility state estimation based on the count of number of times of cell reselection.

In a heterogeneous network, a macro cell is deployed with various types of Low Power Nodes (LPNs) such as micro base stations, pico base stations, femtocell base stations and remote radio units. In addition, due to the differences in transmission power between the various types of small cells, they have different coverages. The conventional mobility state estimation is under a fundamental assumption that the cells in the network have substantially the same coverage. However, in a heterogeneous network, due to the presence of the various types of low power nodes, the above assumption does not stand. In addition, a mobile terminal in a heterogeneous network sees a significantly increase in the number of times of cell switching or reselection, which tends to give the illusion that the mobile terminal is moving at a high speed. Moreover, the lack of accuracy in mobility state estimation will further affect on those mechanisms relating to mobility state estimation, such as speed scale factor, thus failing to meet basic requirements of mobility of mobile terminals in a heterogeneous network.

It is therefore desirable to provide a device and a method in a wireless communication system, to ensure the stability of mobility performance of a mobile terminal in a heterogeneous network, so as to provide the user with a seamless and stable network coverage.

SUMMARY OF INVENTION

According to an embodiment of the present invention, it is provided a system that determines a cell density and cell type in an area corresponding to a location of a user equipment; determines a mobility state of the user equipment based on the determined cell density and the determined cell type; and controls cell reselection for the user equipment based on the determined mobility state of the user equipment.

Using the present invention, the mobility state estimation manner can be determined based on an evaluated denseness of small cells, so as to estimate the mobility state of the mobile terminal, ensuring the stability of mobility performance of the mobile terminal in a heterogeneous network, thus providing the user with a seamless and stable network coverage.

BRIEF DESCRIPTION OF THE DRAWINGS

The above and other objects, characteristics and advantages of the present invention will be understood better when read in conjunction with the description below of the embodiments of the present invention with reference to the accompanying drawings. In the drawings, the same or corresponding reference numerals will be used to denote the same or corresponding features or components.

DESCRIPTION OF THE EMBODIMENTS

The embodiments of the present invention will be described below with reference to the accompanying drawings. It is noted that the representations and descriptions of the components and processes irrelevant to the present invention or known to those skilled in the art have been omitted for clarity.

Figure 1:
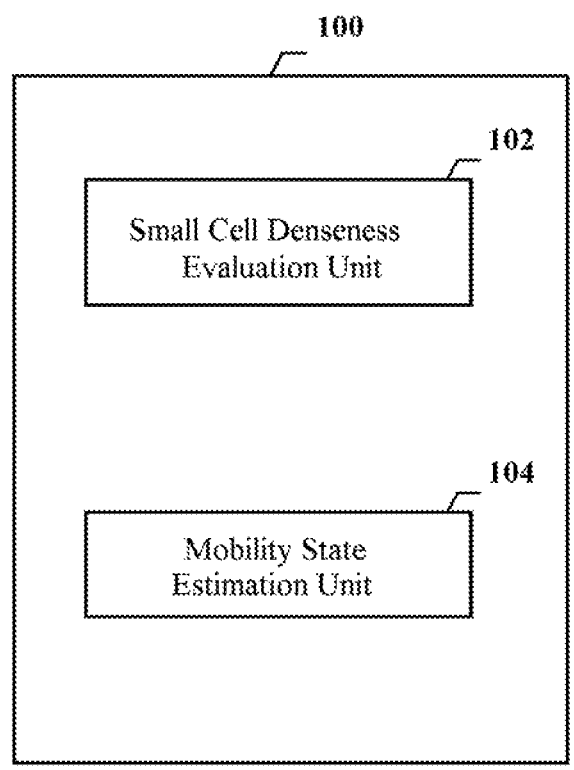
FIG. 1 is a block diagram illustrating a configuration of a device in a wireless communication system according to an embodiment of the present invention.

A configuration of a device in a wireless communication system according to an embodiment of the present invention is described below in conjunction with FIG. 1. FIG. 1 is a block diagram illustrating a configuration of a device in a wireless communication system according to an embodiment of the present invention.

As shown in FIG. 1, the device 100 in a wireless communication system may include a small cell denseness evaluation unit 102 and a mobility state estimation unit 104.

The small cell denseness evaluation unit 102 in the device 100 may evaluate denseness of small cells within a region in which a mobile terminal locates.

The introduction of heterogeneous network has brought change to the conventional cell architectures, and challenges to the conventional mobility state estimation manners. Through their studies, the applicants of the present invention found that heterogeneous networks can further be classified according to their respective attributes. For example, heterogeneous networks can be classified according to the denseness of small cell deployment in a heterogeneous network, e.g., into a small cell densely-deployed category and a small cell non-densely deployed category. Those skilled in the art will understand, the above classification of heterogeneous networks into a small cell densely-deployed category and a small cell non-densely deployed category is exemplary only, and heterogeneous networks may as well be classified according to the denseness of small cell deployment in a heterogeneous network into three or more categories. Moreover, those skilled in the art will also understand that the abovementioned classification of heterogeneous networks based on the denseness of small cell deployment in a heterogeneous network is also exemplary, and heterogeneous networks may as well be classified according to some other attribute of a heterogeneous network. The description below is given mainly with the small cell deployment denseness in a heterogeneous network as an example.

Different denseness of small cell deployment in a heterogeneous network causes a different effect on a conventional network. Specifically, a heterogeneous network with a non-dense small cell deployment may be not much different from a conventional homogeneous network. However, a large demand of businesses usually exist in hot-spot areas such as a city center, a shopping mall, an office and a office building, resulting in a large demand of dense deployment of small cells in these areas. As the denseness of small cells increases, the effect on the mobility performance of a mobile terminal in the conventional network is a change from quantity to quality. For example, dense deployment of small cells may cause frequent cell switching at the mobile terminal. As the denseness of small cells increases, interference between the small cells will increase, causing the probability of switching failure at the mobile terminal to increase accordingly. Furthermore, since the coverage of a small cell is relatively small, the times of switching at the mobile terminal also increases as the denseness of small cells increases, as well as the probability of ping-pong switch. In addition, for the mobile terminal user, the number of switching failures at the mobile terminal, the number of ping-pong switches and so on directly affect the mobile terminal user's experience of the quality of service; and according to the above analysis, dense deployment of small cells will greatly increase the number of switching failures at the mobile terminal, the number of ping-pong switches and so on, which significantly degrades the mobile terminal user's experience of service. Therefore, the denseness of small cell deployment in a heterogeneous network is an important factor in the estimation of the mobility state of a mobile terminal in a heterogeneous network. In order to improve the accuracy of mobility state estimation of a mobile terminal in a heterogeneous network, it is desirable to evaluate the denseness of small cells within a region in which the mobile terminal locates, so as to determine a mobility state estimation manner according to the denseness of the small cells.

It will be described hereinafter in detail on how to evaluate the denseness of small cells within a region in which a mobile terminal locates. Those skilled in the art will understand, the following specific manners for evaluating the denseness of small cells within a region in which a mobile terminal locates is illustrative only and not limiting. Those skilled in the art can make modifications, substitutes or variations to the various specific small cell denseness evaluation manners herein as needed, provided that they can determine the denseness of small cells within a region in which a mobile terminal locates.

According to an embodiment of the present invention, the small cell denseness evaluation unit 102 may receive information of small cell clusters indicating which small cells are adjacent to each other from a base station serving the mobile terminal, and evaluate the denseness of the small cells within the region in which the mobile terminal locates in accordance with the information of small cell clusters.

In a heterogeneous network, a large number of small cells are deployed in the coverage of a macro cell, and the base station serving the mobile terminal can learn the actual position where each small cell is deployed. Therefore, the base station serving the mobile terminal may, according to the actual position where a small cell is deployed, divide multiple small cells adjacent to each other and closely distributed into the same small cell cluster, and form information of small cell clusters indicating which small cells are adjacent to each other. According to the information of small cell clusters, the number of small cells included in a small cell cluster and identifier information of each small cell can be determined. When the mobile terminal detects the identifier information of any small cell in a particular small cell cluster, it may be determined that the mobile terminal is moving towards the small cell cluster to which the small cell belongs. Therefore, the mobile terminal may, according to the number of small cells included in the small cell cluster, determine the denseness of the small cells within the region in which the mobile terminal locates. Thus, according to this embodiment, the determination on whether the small cells is densely deployed is performed at the base station side serving the mobile terminal; the base station may divide small cells closely distributed into the same small cell cluster, and the mobile terminal may, according to the number of small cells included in the small cell cluster, determine the denseness of the deployment of the small cells. Furthermore, according to this embodiment, because the mobile terminal equivalently discovers a small cell cluster to which a small cell belongs as it discovers the small cell, the small cell denseness evaluation manners according to this embodiment is not affected by the trajectory of movement of the mobile terminal.

According to an embodiment of the present invention, the information of small cell clusters may be indicated by information of small cell identifier indexes added in a list of adjacent cells, and the information of small cell identifier indexes may include information of small cell identifiers of adjacent small cells to indicate that these adjacent small cells belong to a same cluster.

The information of small cell clusters may be indicated by adding information of small cell identifier indexes in a list of adjacent cells, or in some other system information block. For example, the first m small cells adjacent to each other may be divided into the first small cell cluster, the next n small cells adjacent to each other may be divided into the second small cell cluster and so on, where m and n are both natural numbers greater than or equal to 1. The information of small cell identifier indexes may include information of the small cell identifier of each adjacent small cell belonging to the same small cell cluster. For example, the information of small cell identifiers of the first small cell cluster may include identifier information of each small cell of the first m small cells belonging to the first small cell cluster, and the information of small cell identifiers of the second small cell cluster may include identifier information of each small cell of the next n small cells belonging to the second small cell cluster. Those skilled in the art will understand that the above information of small cell identifier indexes added in a list of adjacent cells indicating the information of small cell clusters is exemplary only and not limiting, and that the information of small cell clusters may also be indicated in other ways.

Specifically, the information of small cell clusters may be added to the list of adjacent cells, and the list of adjacent cells added with the information of small cell clusters may be broadcast in the system information blocks SIB4, SIB5. In addition, the information of small cell clusters may also be added into some other system information block, and the system information added with the information of small cell clusters may be broadcast. Alternatively, a new system information block may be set for the mobile terminal, exclusively for indicating the information of small cell clusters.

Small cell cluster identifiers may be defined in the information of small cell clusters, to uniquely identify a small cell cluster. Each small cell cluster identifier includes the physical cell identifiers of the small cells belonging to the small cell cluster. In order to reduce the system information load, in actual deployment of small cells, small cells closely distributed may be assigned with consecutive numbers where applicable. Thus, by giving the start position and the range of physical cell identifiers of small cells within a small cell cluster, the small cells can be included into the small cell cluster.

Specifically, the information of small cell clusters may be broadcast by the macro base station side. Because small cells are normally distributed in the coverage of a macro base station, the macro base station can divide the small cells into clusters based on the actual positions where the small cells are deployed in the coverage of the macro cell, and broadcast the formed information of small cell clusters. In addition, a case may exist where a small cell cluster may be under the coverage of multiple macro cells; accordingly, in this case, when the macro base station broadcasts the information of small cell clusters, those small cells needs to be included.

In addition, the broadcast of the information of small cell clusters may also be performed by a small cell. Through information interaction between small cell base stations, the small cell base stations can self-organize a small cell cluster; or, the configuration of small cell clusters may be done directly at the network side. After the small cell clusters are formed, each small cell base station may broadcast physical cell ID identifiers of the other small cells in its small cell cluster. Therefore, upon accessing one small cell, the mobile terminal can get information on other small cells in the small cell cluster to which the current small cell belongs.

Furthermore, according to an embodiment of the present invention, the mobile terminal may obtain the information indicating the denseness of small cells within a region in which the mobile terminal locates directly from the network side, without estimating by the mobile terminal itself the denseness of small cells within a region in which the mobile terminal locates. For example, a macro base station at the network side may determine whether the mobile terminal is in a small cell dense region according to position information of the mobile terminal, and notify the mobile terminal when the mobile terminal is determined to be in a small cell dense region; the mobile terminal obtains the denseness of small cells according to the information notified from the network-side macro base. Specifically, the macro base station may receive GPS information from the mobile terminal, and obtain position information of the mobile terminal according to the GPS information. Furthermore, the macro base station may also generally determine the position information of the mobile terminal according to various measuring methods in the prior art, e.g., by measuring methods like CID, E-CID, AOA, TDOA or fingerprint.

According to an embodiment of the present invention, the small cell denseness evaluation unit may evaluate the denseness of the small cells within the region in which the mobile terminal locates according to a history that the mobile terminal obtains services from the small cells. For example, according to a specific embodiment of the present invention, the mobile terminal may obtain services from the small cells by switching or reselecting to a small cell; or, in at least one of the manners of: carrier aggregation, double-connection and coordinated multiple point transmission through the small cells.

In the case of dense deployment of small cells in a heterogeneous network, multiple small cells are densely distributed. If in a certain period of time the mobile terminal obtains services from the small cells multiple times, it is likely that the mobile terminal is located in a region where small cells are densely deployed. Therefore, the denseness of the small cells within the region in which the mobile terminal locates can be evaluated according to a history that the mobile terminal obtains services from the small cell. For example, in a heterogeneous network including small cells, a mobile terminal can obtain services from a small cell by switching or reselecting to the small cell.

In addition, in small cell enhancement in 3GPP, the original scenario has been further extended. For example, the scenario of carrier aggregation has been introduced in the small cell enhancement, and ideal backhaul and non-ideal backhaul cases are further taken into accounts in the scenario. In addition, the scenario of double-connection has been introduced in the small cell enhancement. In addition, the scenario of coordinated multiple point transmission has been introduced in the small cell enhancement, and so on. Thus, in future heterogeneous networks, a large number of low power nodes and macro cells will jointly serve the mobile terminal through a variety of modes. Therefore, in many cases, the mobile terminal can obtain services from the small cells not only by switching or reselecting to a small cell, but also in at least one of the manners of carrier aggregation, double-connection and coordinated multiple point transmission.

According to an embodiment of the present invention, the small cell denseness evaluation unit 102 may determine whether a type of a target cell from which the mobile terminal obtains services is small cell and count the number of times that the target cell from which the mobile terminal obtains services is a small cell within a predetermined time, and evaluate the denseness of the small cells within the region in which the mobile terminal locates by comparing the number of times with a predetermined threshold of number of times.

Specifically, when the mobile terminal obtains services from the small cells by switching or reselecting to a small cell, it may be determined whether the type of a target cell that the mobile terminal switches or reselects to is a small cell; and a counter may be set at the mobile terminal, and the counter is used to count the number of times that the mobile terminal switches or reselects to a small cell within a predetermined time. In the predetermined time window, the denseness of the small cells within the region in which the mobile terminal locates may be evaluated by comparing the counted number of times with a predetermined threshold of number of times. It should be appreciated by the skilled in the art that multiple predetermined thresholds of number of times may be set according to actual needs. Furthermore, when the mobile terminal obtain services from the small cells in at least one of the manners of carrier aggregation, double-connection and coordinated multiple point transmission through the small cells, since all of the carrier aggregation, double-connection, coordinated multiple point transmission and so on as mentioned herein are related to the scenarios of collaboration between small cells and macro cells or between small cells, the counting may be done separately for each of the small cells associated with the mobile terminal. For example, when the mobile terminal obtain services from the small cells by carrier aggregation through the small cells, the plurality of member carriers may be associated with a number of different small cells; accordingly, by different arrival times or physical cell identifiers or the like, it may be determined which member carriers belong to which small cells, respectively; then, counting may be performed respectively for each small cell that the mobile terminal is associated with. In addition, the method is similar for double-connection or coordinated multiple point transmission, the details of which are therefore omitted.

According to this embodiment, by counting the number of times that the target cell from which the mobile terminal obtains services is a small cell within a predetermined time, the denseness of the small cells within the region in which the mobile terminal locates can be evaluated in a simple, intuitive way.

According to an embodiment of the present invention, the small cell denseness evaluation unit 102 may determine whether the type of a target cell from which the mobile terminal obtains services is small cell and determine the distances between small cells from which the mobile terminal obtains services according to position information of the small cells from which the mobile terminal obtain services, and evaluate the denseness of the small cells within the region in which the mobile terminal locates by comparing the distances with a predetermined distance threshold.

Specifically, when the mobile terminal obtains services from the small cells by switching or reselecting to a small cell, the cell mobile terminal may identify the source cell that the mobile terminal was previously connected to and whether the type of the target cell that the mobile terminal switches or reselects to is small cell, and record the plurality of small cells that the mobile terminal recently switches or reselects to successfully, so as to obtain position information of the small cells that the mobile terminal switches or reselects to. According to the position information of the small cells that the mobile terminal switches or reselects to, the distances between the small cells that the mobile terminal switches or reselects to can be calculated. By comparing the calculated distances between the small cells that the mobile terminal switches or reselects to with a predetermined distance threshold, the denseness of the small cells within the region in which the mobile terminal locates can be evaluated. For example, if it is determined by comparison that the distances between the multiple small cells which the mobile terminal switches or reselects to are close, a case may be determined that the small cells within the region in which the mobile terminal locates are densely deployed. In addition, when the mobile terminal obtain services from the small cells in at least one of the manners of carrier aggregation, double-connection and coordinated multiple point transmission through the small cells, since all of the carrier aggregation, double-connection, coordinated multiple point transmission and so on as mentioned herein are related to the scenarios of collaboration between small cells and macro cells or between small cells, a distance threshold may be calculated separately for each of the small cells associated with the mobile terminal, and the multiple distance thresholds obtained by the calculation may be averaged. For example, when the mobile terminal obtain services from the small cells by carrier aggregation through the small cells, the plurality of member carriers may be associated with a number of different small cells; accordingly, by different arrival times or physical cell identifiers or the like, it may be determined which member carriers belong to which small cells; then, a distance threshold may be calculated separately for each small cell that the mobile terminal is associated with, and the multiple distance thresholds obtained by the calculation may be averaged. In addition, the method is similar for double-connection or coordinated multiple point transmission, the details of which are therefore omitted.

The position information of the small cells from which the mobile terminal obtain services can be obtained in various ways. For example, a parameter related to the position information of small cells may be added in the list of adjacent cells, and the mobile terminal may obtain the position information of small cells by querying the parameter in the list of adjacent cells. As another example, the position information of small cells may be broadcast through a broadcast channel of the small cells, and the mobile terminal obtains the position information of small cells by receiving the broadcast. As yet another example, the mobile terminal may send request information to a small cell according to its needs, to obtain the position information of the small cell. In addition, the position information of small cells may be identified using longitude information and latitude information.

According to an embodiment of the present invention, the predetermined distance threshold is determined according to coverage of the small cells from which the mobile terminal obtains services. For example, the predetermined distance threshold may be determined by calculating a weighted average of small cell distance thresholds corresponding to coverages of the small cells from which the mobile terminal obtains services.

The mobile terminal may acquire the transmission powers of the small cells from which the mobile terminal obtains services, and estimate the coverages of the small cells from which the mobile terminal obtains services according to the transmission powers of the small cells from which the mobile terminal obtains services. The predetermined distance thresholds may be determined according to the coverages of the small cells from which the mobile terminal obtains services, and different small cell coverage may correspond to different small cell distance threshold. According to an embodiment of the present invention, each small cell distance threshold corresponding to a small sell coverage may be determined as the predetermined distance threshold, and the calculated distances between the small cells from which the mobile terminal obtains services may be compared with a corresponding small cell distance threshold respectively, so as to evaluate the denseness of the small cells within the region in which the mobile terminal locates. According to another embodiment of the present invention, an arithmetic average of the small cell distance thresholds corresponding to the respective small sell coverages may be determined as the predetermined distance threshold, and the calculated distances between the small cells from which the mobile terminal obtains services may be compared with the arithmetic average of the small cell distance thresholds, so as to evaluate the denseness of the small cells within the region in which the mobile terminal locates. According to yet another embodiment of the present invention, the small cell distance thresholds corresponding to the small sell coverages may be respectively assigned with corresponding weights, and a weighted average of the small cell distance thresholds corresponding to the small sell coverages may be determined as the predetermined distance threshold, and the calculated distances between the small cells from which the mobile terminal obtains services may be compared with the weighted average of the small cell distance thresholds, so as to evaluate the denseness of the small cells within the region in which the mobile terminal locates.

According to this embodiment, the position information of small cell deployment is further used to calculate the distances between the small cells from which the mobile terminal obtains services, thus providing a more accurate estimation of the denseness within the region in which the small cells locate.

According to an embodiment of the present invention, the small cell denseness evaluation unit 102 may also determine the type and/or coverage of the target cell according to a transmission power of the target cell from which the mobile terminal obtains services.

A heterogeneous network includes a large number of low power nodes such as micro base stations, pico base stations, femtocell base stations and remote radio units. The low power nodes are distributed in the coverages of macro cells, and serve the mobile terminal in different modes along with the macro cells. However, due to the differences in transmission power, backhaul and carrier type of the low power nodes, the complexity of the conventional network architecture is significantly increased, greatly affecting the performance of many mechanisms including mobility state estimation for the mobile terminal. Therefore, in the present invention, according to the above characteristics of heterogeneous networks, the mechanisms including mobility state estimation for the mobile terminal can be improved according to the types of the cell base stations in a heterogeneous network. Hence it is desirable to identify the types of the cell base stations in a heterogeneous network.

In the current LTE standards, the mobile terminal can distinguish different cell base stations through cell identifiers. However, the cell identifier does not include information about the type of the cell base stations. Thus, in the prior art, the mobile terminal cannot identify the type of the cell base station. To this end, a number of methods to identify the type of a cell base station are provided in the present invention as follows.

According to an embodiment of the present invention, the mobile terminal may identify the type of a cell base station according to the transmission power of the cell base station. Different types of cell base stations have different transmission powers; and according to the transmission powers, cell base stations may be divided into micro base stations, pico base stations, relay base stations, femtocell base stations, remote radio units, etc. Typical values of the transmission powers of cell base stations are shown in Table 1 below.

TABLE 1

Typical values of transmission powers of cell base stations

| | Macro base station | Micro base station | Pico base station | Relay base station |
|---|---|---|---|---|
| Transmission power | 43 dBm | 24, 30, 37 dBm (37 dBm in outdoor conditions only) | 30 or 37 dBm | 20 dBm |
| Antenna gain | 15 dBi (3 partitions) | 5 dBi (0 mmi) | 5 dBi (0 mmi) | 5 dBi (0 mmi) |

As shown in Table 1, low power nodes and macro base stations can be distinguished according to the transmission powers of the cell base stations. It is described below in detail on how to identify the type of the cell base station based on the transmission power of the cell base station.

The transmission power of the cell-specific reference signal CRS by a cell base station can be indicated in the system information block SIB2, which can be used to calculate the path loss between the mobile terminal and the cell base station. Thus, the transmission power of the cell base station can be calculated based on the above transmission power of the cell-specific reference signal CRS by the cell base station, so as to distinguish between low power nodes and macro base stations. In addition, the transmission power of cell base stations can be mapped into cell coverages, so as to obtain the cell coverages.

According to this embodiment, the type of a cell base station can be identified at the mobile terminal according to the transmission power of the cell base station, which is simple, effective and does not change the existing standards.

According to an embodiment of the present invention, the small cell denseness evaluation unit 102 may further receive information of cell type indicating a cell type from a base station serving the mobile terminal and determine the type of a target cell according to the information of cell type.

The information of cell type may be added in a system information block, e.g., a cell level identifier, for directly indicating the type of a cell base station, and thus the type of the cell base station can be determined according to the information of cell type. For example, different levels of cells may be numbered so that, for example, a macro base station is set with a cell level number 00, a micro base station is set with a cell level number 01, a pico base station is set with a cell level number 10, and a relay base station is set with a cell level number 11, etc. In addition, the information of cell type may be broadcast in system information of a current cell, or added to the adjacent cell configuration information of measurement control information.

Referring back to FIG. 1, the mobility state estimation unit 104 in the device 100 may determine a mobility state estimation manner according to the estimated denseness of the small cells so as to estimate mobility state of the mobile terminal.

As described above, after the small cell denseness evaluation unit 102 evaluates the denseness of small cells within a region in which a mobile terminal locates, the mobility state estimation unit 104 may determine a mobility state estimation manner for the mobile terminal according to the evaluated denseness of the small cells so as to estimate mobility state of the mobile terminal, thereby improving the performance of mobility state estimation for the mobile terminal. It will be described hereinafter in detail on how to determine a mobility state estimation manner according to the evaluated denseness of the small cells.

According to an embodiment of the present invention, if the evaluated denseness of the small cells is low, the mobility state estimation unit 104 may count only the number of times that the mobile terminal switches or reselects among macro cells and estimate the mobility state of the mobile terminal according to the number of times that the mobile terminal switches or reselects among the macro cells.

If the evaluated denseness of the small cells is low, the heterogeneous network with non-densely deployed small cells may be not much different from a conventional homogeneous network. Therefore, in this case, due to the low denseness of the small cells, the small cells have limited effects on the network, making it feasible to count only the number of times that the mobile terminal switches or reselects among macro cells. Then, according to the number of times that the mobile terminal switches or reselects among macro cells, the mobility state of the mobile terminal can be estimated. The method according to this embodiment yields good results in the cases where small cells are sparsely distributed, and is relatively easy to implement.

According to an embodiment of the present invention, if the evaluated denseness of the small cells is high, the mobility state estimation unit 104 may estimate a movement distance of the mobile terminal according to position information of small cells from which the mobile terminal obtains services and estimate the mobility state of the mobile terminal according to the movement distance of the mobile terminal.

As the denseness of small cells deployed in a heterogeneous network increases, the effect of small cells on the heterogeneous network increases. Therefore, when the denseness of small cells in a heterogeneous network is high, in order to increase the accuracy of mobility state estimation for the mobile terminal, the movement distance of the mobile terminal may be estimated according to position information of small cells from which the mobile terminal obtains services. As described above, the mobile terminal can obtain services from the small cells by switching or reselecting to a small cell; or, in at least one of the manners of carrier aggregation, double-connection and coordinated multiple point transmission through the small cells. Then, the mobility state of the mobile terminal may be estimated according to the movement distance of the mobile terminal. According to this embodiment, due to the further use of the position information of the small cells, the accuracy of mobility state estimation for the mobile terminal can be improved.

It can be seen from the above analysis that a mobility state estimation manner can be determined according to the evaluated denseness of the small cells, and the determined mobility state estimation manners can serve as good complements with each other, jointly ensuring the performance of mobility state estimation under different circumstances, thereby eliminating the problems encountered in mobility state estimation in heterogeneous networks.

According to an embodiment of the present invention, the mobility state estimation unit 104 may count the number of times that the mobile terminal switches or reselects among macro cells and the number of times that the mobile terminal obtains services from the small cells respectively, and estimate the mobility state of the mobile terminal according to a weighted sum of the number of times that the mobile terminal switches or reselects among the macro cells and the number of times that the mobile terminal obtains services from the small cells, where the cell weight factors of the small cells and the macro cells are adjusted adaptively according to the evaluated denseness of the small cells to calculate the weighted sum.

In order to estimate the mobility state of the mobile terminal, the number of times that the mobile terminal switches or reselects among macro cells and the number of times that the mobile terminal obtains services from the small cells may be counted respectively; a weighted sum of the number of times that the mobile terminal switches or reselects among the macro cells and the number of times that the mobile terminal obtains services from the small cells can be calculated according to cell weight factors of the small cells and the macro cells; and the mobility state of the mobile terminal may be estimated according to the calculated weighted sum. Thus, the configuration of the weight factors of the small cells and the macro cells has a big impact on the performance of mobility state estimation for the mobile terminal, and hence a single set of cell weight factors will not fit with the various situations in a variety of heterogeneous networks. In order to improve the performance of mobility state estimation for the mobile terminal, the cell weight factors of the small cells and the macro cells may be adjusted adaptively according to the evaluated denseness of the small cells to calculate the weighted sum. According to this embodiment, the cell weight factors of the small cells and the macro cells may be adjusted adaptively according to the denseness of the small cells, so as to fit with the various situations in a variety of heterogeneous networks.

In addition, as described above, in small cell enhancement in 3GPP, the original scenario has been further extended. For example, the scenario of carrier aggregation has been introduced in small cell enhancement, and the scenario further takes ideal backhaul and non-ideal backhaul cases into account. In addition, the scenario of double-connection has been introduced in small cell enhancement. In addition, the scenario of coordinated multiple point transmission has been introduced in small cell enhancement, and so on. Thus, in future heterogeneous networks, the collaboration modes between small cells and macro cells will be enriched, and mobility state estimation in scenarios such as carrier aggregation, double-connection and coordinated multiple point transmission has to be further extended.

Conventional mobility state estimation is based on the number of times of successful cell reselection or switching. However, in future heterogeneous networks, a large number of low power nodes and macro cells will jointly serve the mobile terminal through a variety of modes. Therefore, in many cases, the mobile terminal does not obtain services from the small cells by switching or reselecting to a small cell; instead, the mobile terminal in a connected state obtains services from the small cells in at least one of the manners of carrier aggregation, double-connection and coordinated multiple point transmission.

A mobile terminal in a connected state obtaining services from a particular small cell means the mobile terminal is within the coverage of the small cell. However, according to the conventional manner of mobility state estimation, switching or reselecting is counted only when the mobile terminal switches or reselects to a small cell through cell switching or reselection, i.e., the primary service cell of the mobile terminal is the small cell. Thus, many other scenarios such as carrier aggregation, double-connection and coordinated multiple point transmission would be excluded from consideration of mobility state estimation. Therefore, when taking into account of the change in future heterogeneous networks, in the mobility state estimation for the mobile terminal according to the present invention, the mobile terminal can obtain services from small cells by switching or reselecting to a small cell, or in at least one of the manners of carrier aggregation, double-connection and coordinated multiple point transmission through the small cells.

Specifically, in mobility state estimation for the mobile terminal, it is not limited to the number of times that the mobile terminal switches or reselects to cells; but also should take into account of the number of times that the mobile terminal in a connected state obtains the service from a small cell in at least one of the manners of carrier aggregation, double-connection and coordinated multiple point transmission (for example, in the carrier aggregation manner, the mobile terminal is assigned with a member carrier by the small cell.).

According to an embodiment of the present invention, the mobility state estimation unit 104 may further accumulate the number of times that the mobile terminal obtains services from the small cells in the unit of a predetermined area, and determine that the mobile terminal is able to obtain services from the small cells within the predetermined area if the result of the accumulating is larger than a predetermined count threshold.

The number of times that the target cell from which the mobile terminal obtains services within a predetermined area is a small cell may be accumulated, and the result of the accumulating may be used as another criterion for determining whether the mobile terminal is able to obtain service from a small cell, which is parallel to mobility state estimation. As a more specific example, the accumulating may be performed in the unit of a small cell cluster, and when the mobile terminal switches from the first small cell cluster to another small cell cluster, the accumulating result of the number of times that the mobile terminal obtains services from small cells in a first small cell cluster is cleared to restart counting; or the accumulating result is held for a predetermined period of time, and the stored accumulating result of the number of times that the mobile terminal obtains services from small cells in a first small cell cluster is continuously used if the mobile terminal switches back to the first small cell cluster within the predetermined period of time. In addition, since a macro cell does not belong to any small cell cluster, the case where the mobile terminal switches back to a macro cell does not constitute a switching between small cell clusters. Those skilled in the art shall understand that the above use of small cell cluster as a predetermined area is exemplary only; and other regions may as well be used as the predetermined area, e.g., the coverage of a macro base station.

It is described below in detail on how to determine that the mobile terminal switches to another small cell cluster.

According to an embodiment of the present invention, whether the mobile terminal switches to another small cell cluster may be determined according to the information of small cell clusters indicating which small cells are adjacent to each other.

For example, the identifier of the small cell that the mobile terminal switches to may be compared with the identifiers of the small cells included in the information of small cell clusters, so as to determine whether the mobile terminal switches to another small cell cluster.

According to an embodiment of the present invention, the distance between the two small cells that the mobile terminal switches from and to may be determined according to position information of the small cells, and whether the mobile terminal switches to another small cell cluster may be determined according the determined distance between the two small cells.

For example, the distance between the two small cells that the mobile terminal switches from and to may be determined according to position information of the source cell that the mobile terminal is previously connected to and position information of the target cell that the mobile terminal switches to. If the distance between the two small cells involved in the switching is too large, it is determined that the mobile terminal switches to another small cell cluster.

According to an embodiment of the present invention, when the mobile terminal encounters multiple consecutive switching failures or encounters multiple switching failures in a predetermined period of time, the accumulating result of the number of times that the mobile terminal obtains services from small cells in the small cell cluster may be cleared to restart counting.

In addition to the case where the mobile terminal switches to another small cell cluster, the accumulating result of the number of times that the mobile terminal obtains services from small cells in the first small cell cluster also needs to be cleared to restart counting when the mobile terminal encounters multiple consecutive switching failures or encounters multiple switching failures in a predetermined period of time.

According to an embodiment of the present invention, the mobility state estimation unit 104 may further compare the accumulating result of the number of times that the mobile terminal obtains services from small cells in a small cell cluster with a predetermined count threshold, and determine that the mobile terminal is able to obtain services from the small cells once the accumulating result is greater than a predetermined count threshold, regardless of any other determination criterion on whether the mobile terminal is able to obtain services from the small cells (e.g., mobility state estimation result).

Currently, the type of small cell switching at the mobile terminal depends on the mobility state estimation result; however, the mobility state estimation mechanism may result in estimation error. For example, in the case where a mobile terminal is moving with an elevator in a building, each floor may cause a switching or a reselection. For the mobility state estimation strategies based only on the count of switches or reselections, this situation may be misclassified as a high-speed moving state, preventing the mobile terminal from accessing the small cell. Actually, however, if the mobile terminal can switch successfully many times in a small cell cluster, the mobility state of the mobile terminal is proved suitable for small cell switching. Therefore, the accumulating result of the number of times that the mobile terminal obtains services from the small cells in a predetermined area can be used as a separate estimation criterion parallel to mobility state estimation. If, within a predetermined range, e.g., within a small cell cluster, the accumulating result of the number of times that the mobile terminal obtains services from the small cells exceeds the predetermined count threshold, then it indicates that the mobile terminal successfully receives services from the small cells within the small cell cluster. Moreover, since the mobile terminal can obtain services from the small cells many times, the mobility state of the mobile terminal is bound to meet the mobility requirements in the small cell deployment scenario. Therefore, in this case, even if it is determined that the mobile terminal cannot obtain services from the small cells according to the current result of mobility state estimation, the result of mobility state estimation can be ignored. That is, as long as the accumulating result of the number of times that the mobile terminal receives services from the small cells within the predetermined area is greater than the predetermined count threshold, it is determined that that the mobile terminal can obtain services from the small cells, regardless of any other determination criterion on whether the mobile terminal can obtain services from the small cells, e.g., no matter what the mobility state estimation result is.

Figure 2:
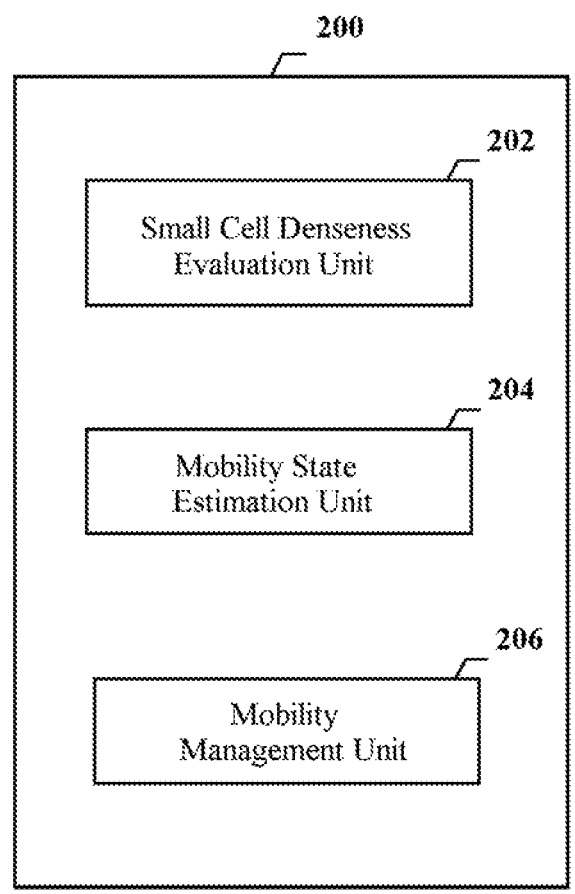
FIG. 2 is a block diagram illustrating another configuration of a device in a wireless communication system according to an embodiment of the present invention.

Another configuration of a device in a wireless communication system according to an embodiment of the present invention is described below with reference to FIG. 2. FIG. 2 is a block diagram illustrating another configuration of a device in a wireless communication system according to an embodiment of the present invention.

As shown in FIG. 2, the device 200 in a wireless communication system includes a small cell denseness evaluation unit 202, a mobility state estimation unit 204 and a mobility management unit 206. Among the units, the configurations of the small cell denseness evaluation unit 202 and the mobility state estimation unit 204 of the device 200 are the same as the configurations of the small cell denseness evaluation unit 102 and the mobility state estimation unit 104 of the device 100 shown in FIG. 1, respectively, the specific details of which are therefore omitted here. The mobility management unit 206 in the device 200 will be described hereinafter in detail.

As shown in FIG. 2, the mobility management unit 206 may control cell reselection for the mobile terminal in a free state according to the evaluated denseness of the small cells and/or to control cell switching for the mobile terminal in a connected state according to the estimated result of the mobility state.

In a free mode, mobility management is controlled by the mobile terminal, mainly relating to the cell reselection mechanism. Cell reselection for the mobile terminal in a free state may be controlled according to the evaluated denseness of the small cells. It is described below in detail on how to control cell reselection for the mobile terminal in a free state according to the denseness of the small cells.

According to an embodiment, the mobility management unit 206 may further prevent the mobile terminal in a free state from performing cell search and/or cell measurement for the small cells in the case where the evaluated denseness of the small cells is high, and allow the mobile terminal in a free state to perform cell search and/or cell measurement for the small cells in the case where the estimated denseness of the small cells is low.

When the mobile terminal is in the scenario where the denseness of the small cell deployment is high, the signal quality of a small cell is normally higher than the signal quality of a macro cell, thus triggering cell reselection at the mobile terminal. However, as the small cells are densely deployed, cell reselection may be triggered frequently, increasing power consumption of the mobile terminal. Therefore, in the case where the denseness of the small cells is high, in order to reduce power consumption of the mobile terminal, a mobile terminal in a free mobile may be prevented from performing cell search and/or cell measurement for the small cells; in stead, remaining connecting to the macro cell is preferable. In addition, in the case where the denseness of the small cells is low, a mobile terminal in a free mobile may be allowed to perform cell search and/or cell measurement for the small cells.

According to an embodiment, if the evaluated denseness of the small cells is high, the mobility management unit 206 may further allow the mobile terminal in a free state to perform cell search and/or cell measurement for the small cells if service quality of macro cells is lower than a first predetermined threshold or the difference between service quality of the small cells and the service quality of the macro cells is larger than a second predetermined threshold.

In addition, in some cases, small cells are for a better network coverage. Therefore, taking such cases into account, if the denseness of the small cells is high, the mobile terminal in a free state may be allowed to perform cell search and/or cell measurement for the small cells if service quality of macro cells is lower than a first predetermined threshold or the difference between service quality of the small cells and the service quality of the macro cells is larger than a second predetermined threshold.

In a connected state, the conventional mobility management is controlled by the base station, mainly relating to the cell switching mechanism. As described above, the introduction of heterogeneous network has a significant impact on cell switching, wherein the increase of switching failure probability makes it impossible to ensure the mobility performance of the mobile terminal. In a network, instead of the switching failure probability, it is switching failures and the number of switching failures that directly affect the mobile terminal user's experience. Therefore, one of the most important aspects in mobility management is how to improve the mobile terminal user's experience in a heterogeneous network. In the process of cell switching, a major affecting factor is the mobility state of the mobile terminal. Therefore, cell switching for a mobile terminal in a connected state may be controlled according to the estimation result of the mobility state of the mobile terminal by the mobile terminal.

Switching in a heterogeneous network has the following characteristics: the higher the speed of the mobile terminal, the less appropriate for it to switch to a small cell. As the speed of the mobile terminal increases, the residence time within the small cell and the reaction time for switching of the mobile terminal are both greatly reduced. In addition, due to their limited transmission power, small cells have limited coverages. Thus, for a high-speed mobile terminal, if it attempts to access a small cell, the mobile terminal is likely to encounter wireless link failure, causing the switching to fail, and may easily be switched back to the macro cell, resulting in ping-pong switches. Therefore, in the control of cell switching for the mobile terminal in a connected state, it is desirable to consider the result of mobility state estimation for the mobile terminal.

Figure 3:
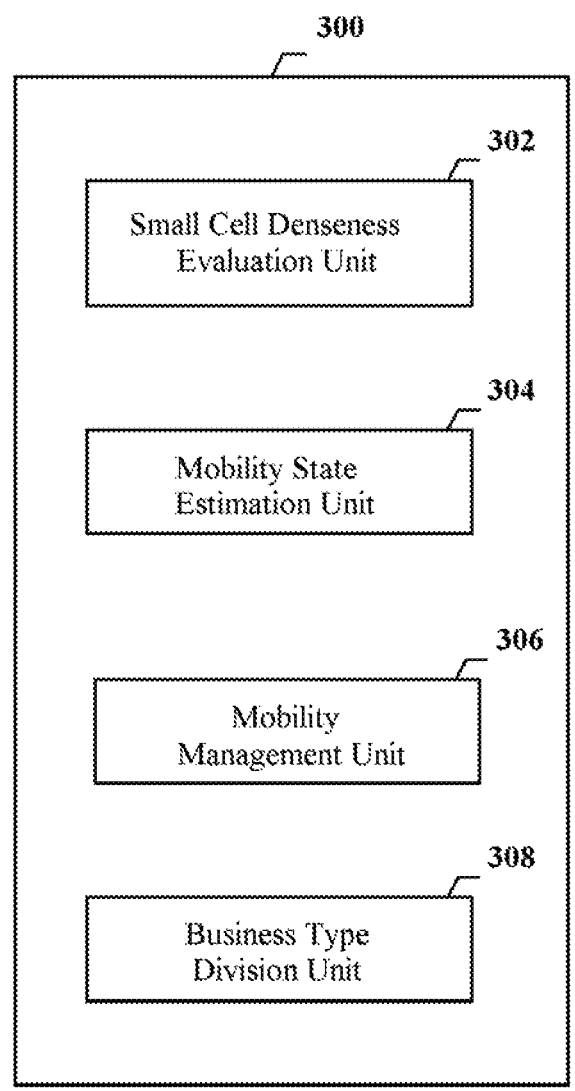
FIG. 3 is a block diagram illustrating yet another configuration of a device in a wireless communication system according to an embodiment of the present invention.

Another configuration of a device in a wireless communication system according to an embodiment of the present invention is described below with reference to FIG. 3. FIG. 3 is a block diagram illustrating another configuration of a device in a wireless communication system according to an embodiment of the present invention.

As shown in FIG. 3, the device 300 in a wireless communication system includes a small cell denseness evaluation unit 302, a mobility state estimation unit 304, a mobility management unit 306 and a business type division unit 308. Among these units, the configurations of the small cell denseness evaluation unit 302, the mobility state estimation unit 304 and the mobility management unit 306 of the device 300 are the same as the configurations of the small cell denseness evaluation unit 202, the mobility state estimation unit 204 and the mobility management unit 206 of the device 200 shown in FIG. 2, respectively, the specific details of which are therefore omitted here. The business type division unit 308 in the device 300 will be described hereinafter in detail.

As shown in FIG. 3, the business type division unit 308 may divide businesses at the mobile terminal into different business types according to time delay sensitivity of the businesses at the mobile terminal.

In the prior art, in cell switching, normally only the quality of link where the mobile terminal is located is considered, but the business type of the mobile terminal is not considered. However, actually, the business type of the mobile terminal will affect the cell switching at the mobile terminal, especially in a heterogeneous network environment. For example, the business types of the mobile terminal can be classified into a type of high time delay sensitivity and a type of low time delay sensitivity. For example, businesses with high time delay sensitivity may include session-type and streaming-media-type businesses, while businesses with low time delay sensitivity may include interaction-type and background-type businesses. Businesses with high time delay sensitivity have a low tolerance to time delay; hence it is preferable to prevent a mobile terminal performing a business with high time delay sensitivity from frequent cell switching. In addition, businesses with low time delay sensitivity have a high tolerance to time delay; hence a mobile terminal performing a business with low time delay sensitivity may be switched to a small cell, for diversion. Therefore, the business type of the mobile terminal may be taken into account in the control of cell switching for a mobile terminal in a connected state.

For example, according to time delay sensitivity of the businesses at the mobile terminal, the businesses at the mobile terminal may be classified into a business of high time delay sensitivity and a business of low time delay sensitivity. In addition, the businesses with high time delay sensitivity may be set with a time delay sensitivity coefficient 0, and the businesses with low time delay sensitivity may be set with a time delay sensitivity coefficient 1. The time delay sensitivity coefficients of the businesses at the mobile terminal are used only inside the mobile terminal, providing a reference for determining the cell switching mode for the mobile terminal. Those skilled in the art will understand, the classification of the businesses at the mobile terminal into a business of high time delay sensitivity and a business of low time delay sensitivity based on the time delay sensitivity of the businesses at the mobile terminal is merely exemplary and not limiting; and the businesses at the mobile terminal may be classified into more types according to the time delay sensitivity of a business at the mobile terminal.

According to an embodiment of the present invention, if at least one of the plurality of businesses in a connected state at the mobile terminal has a high time delay sensitivity, the business type division unit 308 may further determine a collective time delay sensitivity of the businesses at the mobile terminal to be high.

When multiple businesses are connected at the mobile terminal, a collective time delay sensitivity of the businesses at the mobile terminal may be determined to be high if at least one of the plurality of businesses in a connected state at the mobile terminal has a high time delay sensitivity. This ensures that the time delay sensitivity requirement of the businesses at the mobile terminal is met collectively.

According to an embodiment of the present invention, the mobility management unit 306 may filter switchable target cells for the mobile terminal in a connected state according to the estimation result of the mobility state of the mobile terminal and the business type and perform cell measurement and/or measurement report for the filtered target cells to perform cell switching for the mobile terminal.

When the mobile terminal receives adjacent cell list configuration information provided by the measurement control information from the network side, the mobile terminal may determine the type of an adjacent small cell accordingly, e.g., by querying a cell level identifier of the adjacent small cell. Then, the mobile terminal may estimate its mobility state, and filter switchable target cells for the mobile terminal in a connected state according to the estimation result of the mobility state of the mobile terminal and the business type, and perform cell measurement and/or measurement report for the filtered target cells to perform cell switching for the mobile terminal, thereby reducing unnecessary measurement so that cell switching at the mobile terminal can be more purposeful.

For the cell switching methods in a heterogeneous network, a specific example is given in Table 2. Those skilled in the art will understand, the cell switching methods in a heterogeneous network shown in Table 2 are exemplary only and not limiting; and other cell switching methods may be adopted.

TABLE 2

| Mobile terminal | cell switching strategies in a heterogeneous network ||| 
|---|---|---|---|
| | Base station type ||| 
| type to be connected to a base station | Macro base station | Relay base station | Micro base station |
| High time delay sensitivity | High speed/Medium speed/Low speed | High speed/Medium speed/Low speed | Low speed |
| Low time delay sensitivity | High speed/Medium speed/Low speed | High speed/Medium speed/Low speed | Medium speed/Low speed |

In the cell switching methods shown in Table 2, the estimation results of the mobility state of the mobile terminal may be classified as High speed, Medium speed and Low speed. According to an embodiment of the present invention, cell switching for a mobile terminal in a connected state may be controlled according to only the estimation result of the mobility state of the mobile terminal. For example, as shown in Table 2, for a high speed mobile terminal, only macro base stations and relay base stations can be its target cell in cell switching, i.e., a high speed mobile terminal can only be switched to a macro base station or a relay base station. For a low-speed mobile terminal, macro base stations, relay base stations and micro base stations can be its target cell in cell switching, i.e., a low speed mobile terminal can be switched to any one of macro base station, relay base station and micro base station. In addition, in the cell switching methods shown in Table 2, the businesses at the mobile terminal can be classified into a business type of high time delay sensitivity and a business type of low time delay sensitivity. According to an embodiment of the present invention, the switchable target cells for the mobile terminal in a connected state may be filtered according to the estimation result of the mobility state of the mobile terminal and the business type, and cell switching may be performed for the mobile terminal according to the filtering result. For example, as shown in Table 2, for a business type of high time delay sensitivity in a medium speed mobile terminal, only macro base stations and relay base stations can be its target cell in cell switching; while a business type of low time delay sensitivity in a medium speed mobile terminal, macro base stations, relay base stations and micro base stations can be its target cell in cell switching.

Figure 4:
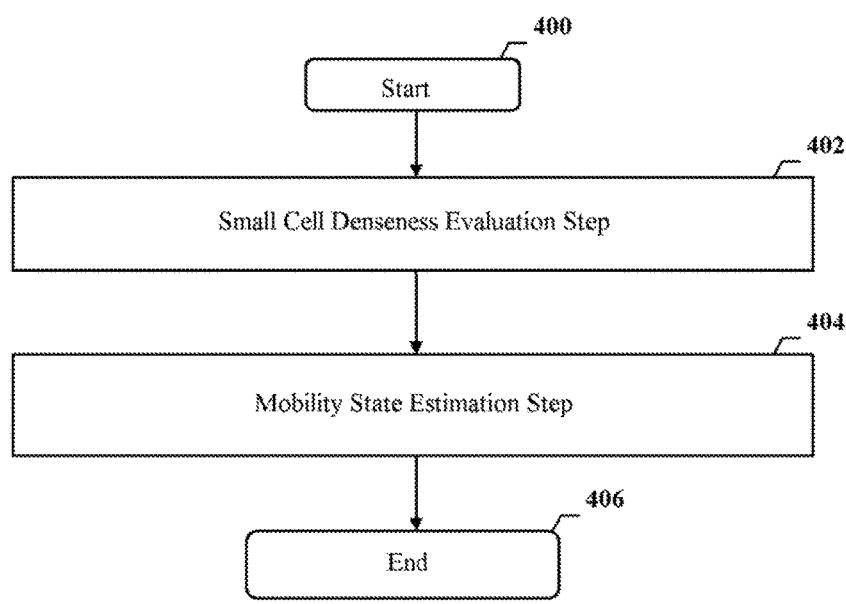
FIG. 4 is a flow chart illustrating a method used in a wireless communication system according to another embodiment of the present invention.

The process of a method used in a wireless communication system according to an embodiment of the present invention is described below with reference to FIG. 4. FIG. 4 is a flow chart illustrating a method used in a wireless communication system according to an embodiment of the present invention.

As shown in FIG. 4, the method starts at step 400. The method proceeds to step 402 after step 400.

Step 402 is a small cell denseness evaluation step. In step 402, the denseness of small cells within a region in which a mobile terminal locates may be evaluated.

The method proceeds to step 404 after step 402.

Step 404 is a mobility state estimation step. In step 404, a mobility state estimation manner may be determined according to the evaluated denseness of the small cells so as to estimate the mobility state of the mobile terminal.

Then, the method ends at step 406.

The method shown in FIG. 4 is a method corresponding to the device shown in FIG. 1, the specific details of which are omitted here.

According to an embodiment of the present invention, in the small cell denseness evaluation step 402, information of small cell clusters indicating which small cells are adjacent to each other may be received from a base station serving the mobile terminal, and the denseness of the small cells within the region in which the mobile terminal locates may be evaluated in accordance with the information of small cell clusters.

According to an embodiment of the present invention, the information of small cell clusters may be indicated by information of small cell identifier indexes added in a list of adjacent cells, and the information of the small cell identifier indexes may include information of small cell identifiers of adjacent small cells to indicate that these adjacent small cells belong to a same cluster.

According to an embodiment of the present invention, in the small cell denseness evaluation step 402, the denseness of the small cells within the region in which the mobile terminal locates may be evaluated according to a history that the mobile terminal obtains services from the small cells.

According to an embodiment of the present invention, in the small cell denseness evaluation step 402, whether the type of a target cell from which the mobile terminal obtains services is small cell may be determined, and the number of times that the target cell from which the mobile terminal obtains services is a small cell within a predetermined time may be counted; and the denseness of the small cells within the region in which the mobile terminal locates may be evaluated by comparing the number of times with a predetermined threshold of number of times.

According to an embodiment of the present invention, in the small cell denseness evaluation step 402, whether the type of a target cell from which the mobile terminal obtains services is small cell may be determined, and the distances between small cells from which the mobile terminal obtains services may be determined according to position information of the small cells from which the mobile terminal obtain services; and the denseness of the small cells within the region in which the mobile terminal locates may be evaluated by comparing the distances with a predetermined distance threshold.

According to an embodiment of the present invention, the predetermined distance threshold may be determined according to the coverages of the small cells from which the mobile terminal obtains services.

According to an embodiment of the present invention, in the small cell denseness evaluation step 402, the type and/or coverage of a target cell from which the mobile terminal obtain services may be also determined according to a transmission power of the target cell.

According to an embodiment of the present invention, in the small cell denseness evaluation step 402, information of cell type indicating a cell type may be received from a base station serving the mobile terminal, and the type of a target cell may be determined according to the information of cell type.

According to an embodiment of the present invention, in the mobility state estimation step 404, it is possible that, if the evaluated denseness of the small cells is low, only the number of times that the mobile terminal switches or reselects among macro cells is counted, and the mobility state of the mobile terminal can be estimated according to the number of times that the mobile terminal switches or reselects among the macro cells.

According to an embodiment of the present invention, in the mobility state estimation step 404, if the evaluated denseness of the small cells is high, a movement distance of the mobile terminal can be estimated according to position information of small cells from which the mobile terminal obtains services, and the mobility state of the mobile terminal can be estimated according to the movement distance of the mobile terminal.

According to an embodiment of the present invention, in the mobility state estimation step 404, the number of times that the mobile terminal switches or reselects among macro cells and the number of times that the mobile terminal obtains services from the small cells can be counted respectively, and the mobility state of the mobile terminal can be estimated according to a weighted sum of the number of times that the mobile terminal switches or reselects among the macro cells and the number of times that the mobile terminal obtains services from the small cells, where cell weight factors of the small cells and the macro cells are adjusted adaptively according to the evaluated denseness of the small cells to calculate the weighted sum.

According to an embodiment of the present invention, in the mobility state estimation step 404, the number of times that the mobile terminal obtains services from the small cells can be accumulated in a unit of a predetermined area, and it is determined that the mobile terminal is able to obtain services from the small cells within the predetermined area if a result of the accumulating is larger than a predetermined count threshold.

According to an embodiment of the present invention, the mobile terminal is able to obtain services from the small cells in at least one manner of switching or reselecting to small cells, and carrier aggregation, double-connection and coordinated multiple point transmission through small cells.

Figure 5:
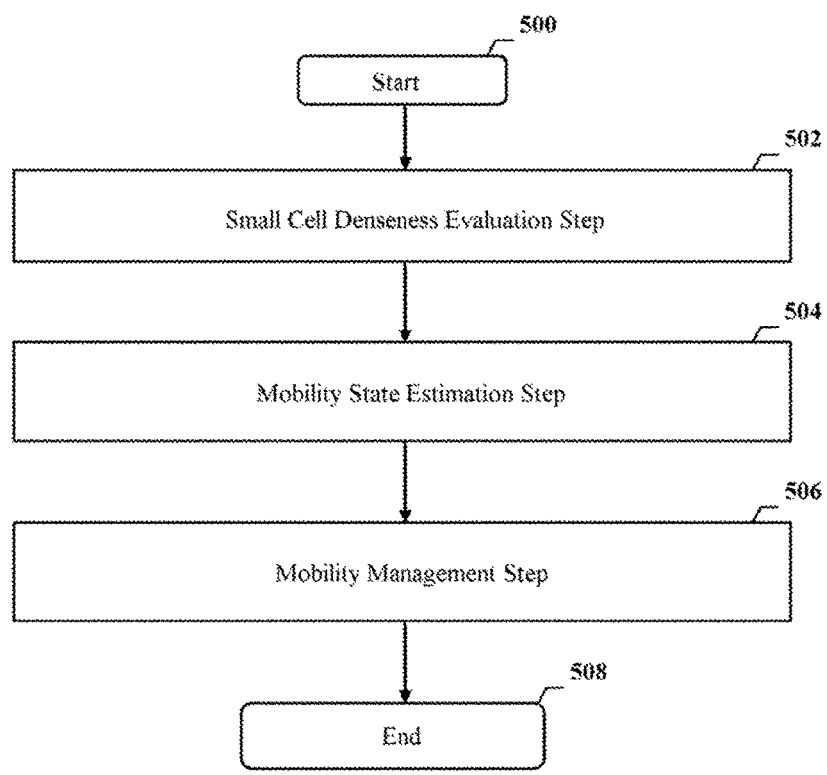
FIG. 5 is a flow chart illustrating a method used in a wireless communication system according to another embodiment of the present invention.

The process of a method used in a wireless communication system according to another embodiment of the present invention is described below with reference to FIG. 5. FIG. 5 is a flow chart illustrating a method used in a wireless communication system according to another embodiment of the present invention.

As shown in FIG. 5, the method used in a wireless communication system includes a small cell denseness evaluation step 502, a mobility state estimation step 504 and a mobility management step 506. Among the steps, the process of the small cell denseness evaluation step 502 and the mobility state estimation step 504 in the method are the same as that of the small cell denseness evaluation step 402 and the mobility state estimation step 404 in the method shown in FIG. 4, the specific details of which are therefore omitted here. The mobility management step 506 in the method is described in detail below.

As shown in FIG. 5, in the mobility management step 506, cell reselection for the mobile terminal in a free state may be controlled according to the evaluated denseness of the small cells, and/or cell switching for the mobile terminal in a connected state may be controlled according to the estimated result of the mobility state.

According to an embodiment of the present invention, in the mobility management step 506, the mobile terminal in a free state can be prevented from performing cell search and/or cell measurement for the small cells in the case where the evaluated denseness of the small cells is high; the mobile terminal in a free state can be allowed to perform cell search and/or cell measurement for the small cells in the case where the evaluated denseness of the small cells is low.

According to an embodiment of the present invention, in the mobility management step 506, it is also possible that, if the evaluated denseness of the small cells is high, the mobile terminal in a free state is allowed to perform cell search and/or cell measurement for the small cells if service quality of macro cells is lower than a first predetermined threshold or a difference between service quality of the small cells and the service quality of the macro cells is larger than a second predetermined threshold which is set in advance.

Figure 6:
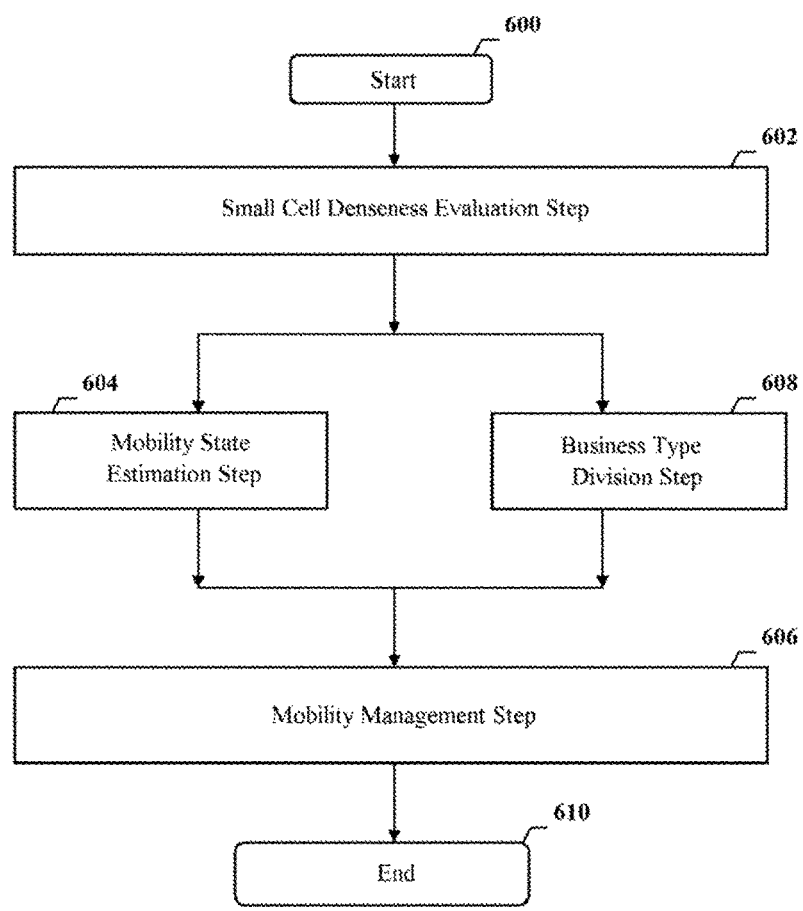
FIG. 6 is a flow chart illustrating a method used in a wireless communication system according to another embodiment of the present invention.

The process of a method used in a wireless communication system according to another embodiment of the present invention is described below with reference to FIG. 6. FIG. 6 is a flow chart illustrating a method used in a wireless communication system according to another embodiment of the present invention.

As shown in FIG. 6, the method used in a wireless communication system includes a small cell denseness evaluation step 602, a mobility state estimation step 604, a mobility management step 606 and a business type division step 608. Among the steps, the process of the small cell denseness evaluation step 602 and the mobility state estimation step 604 in the method are the same as that of the small cell denseness evaluation step 502 and the mobility state estimation step 504 in the method shown in FIG. 5, the specific details of which are therefore omitted here. The mobility management step 606 and the business type division step 608 in the method are described in detail below.

As shown in FIG. 6, in the business type division step 608, businesses at the mobile terminal can be divided into different business types according to time delay sensitivity of the businesses at the mobile terminal; in the mobility management step 606, switchable target cells for the mobile terminal in a connected state can be filtered according to the estimated result of the mobility state of the mobile terminal and the business type, and cell measurement and/or measurement report can be performed for the filtered target cells, so as to perform cell switching for the mobile terminal.

A configuration of a device in a wireless communication system according to another embodiment of the present invention is described below in conjunction with FIG. 7.

Figure 7:
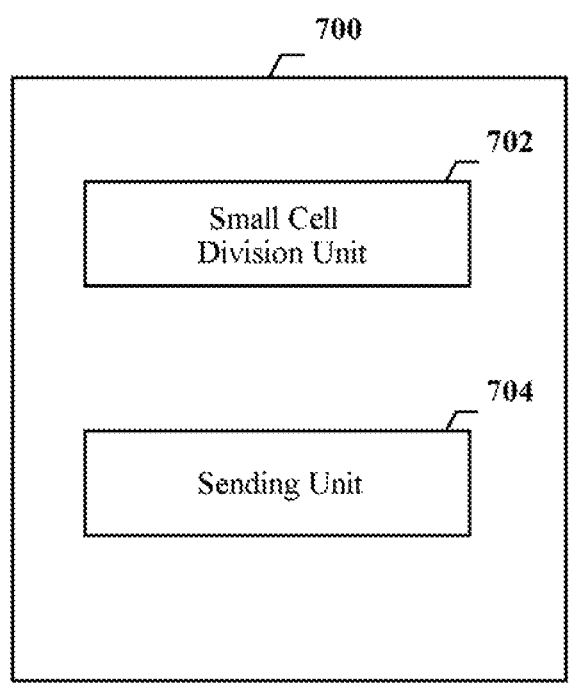
FIG. 7 is a block diagram illustrating a configuration of a device in a wireless communication system according to another embodiment of the present invention.

FIG. 7 is a block diagram illustrating a configuration of a device in a wireless communication system according to another embodiment of the present invention.

As shown in FIG. 7, the device 700 in a wireless communication system may include a small cell division unit 702 and a sending unit 704.

The small cell division unit 702 in the device 700 may divide small cells adjacent to each other into small cell clusters and form information of small cell clusters indicating which small cells are adjacent to each other.

In a heterogeneous network, a large number of small cells are deployed in the coverage of a macro cell, and the base station serving the mobile terminal can learn the actual position where each small cell is deployed. Therefore, the base station serving the mobile terminal may divide, according to the actual position where a small cell is deployed, multiple small cells adjacent to each other and closely distributed into the same small cell cluster, and form information of small cell clusters indicating which small cells are adjacent to each other. The number of small cells included in the small cell cluster and the identifier information of the respective small cells can be determined based on the information of the small cell cluster.

According to an embodiment of the present invention, the information of small cell clusters is indicated by information of small cell identifier indexes added in a list of adjacent cells, the information of small cell identifier indexes including information of small cell identifiers of adjacent small cells to indicate that these adjacent small cells belong to a same cluster.

The information of small cell clusters may be indicated by adding information of small cell identifier indexes in a list of adjacent cells, or in some other system information block. For example, the first m small cells adjacent to each other may be divided into the first small cell cluster, the next n small cells adjacent to each other may be divided into the second small cell cluster and so on, where m and n are both natural numbers greater than or equal to 1. The information of small cell identifier indexes may include information of the small cell identifier of each adjacent small cell belonging to the same small cell cluster. For example, the information of small cell identifiers of the first small cell cluster may include identifier information of each small cell of the first m small cells belonging to the first small cell cluster, and the information of small cell identifiers of the second small cell cluster may include identifier information of each small cell of the next n small cells belonging to the second small cell cluster. Those skilled in the art will understand that the above information of small cell identifier indexes added in a list of adjacent cells indicating the information of small cell clusters is exemplary only and not limiting; the information of small cell clusters may also be indicated in other ways.

Referring back to FIG. 7, the sending unit 704 in device 700 may send position information of the small cells and/or parameter information related to coverage of the small cells to the mobile terminal. For example, according to an embodiment of the present invention, the parameter information related to coverage of the small cells may include information of transmission power of the small cells.

As described above, in a heterogeneous network, a large number of small cells are deployed in the coverage of a macro cell, and the base station serving the mobile terminal can learn the actual position where each small cell is deployed and/or parameter information related to the coverages of the small cells. For example, the parameter information related to coverage of the small cells may include information of transmission power of the small cells. Hence, the base station serving the mobile terminal may send the position information of the small cells and/or the parameter information related to coverage of the small cells to the mobile terminal. In addition, as described above, the transmission power of the cell-specific reference signal CRS by a cell base station can be indicated in the system information block SIB2, which can be used to calculate the path loss between the mobile terminal and the cell base station. Thus, the base station serving the mobile terminal may also send to the mobile terminal the transmission power of the cell-specific reference signal CRS by the cell base station, and the mobile terminal may calculate the transmission power of the cell base station according to the transmission power of the cell-specific reference signal CRS by the cell base station.

Figure 8:
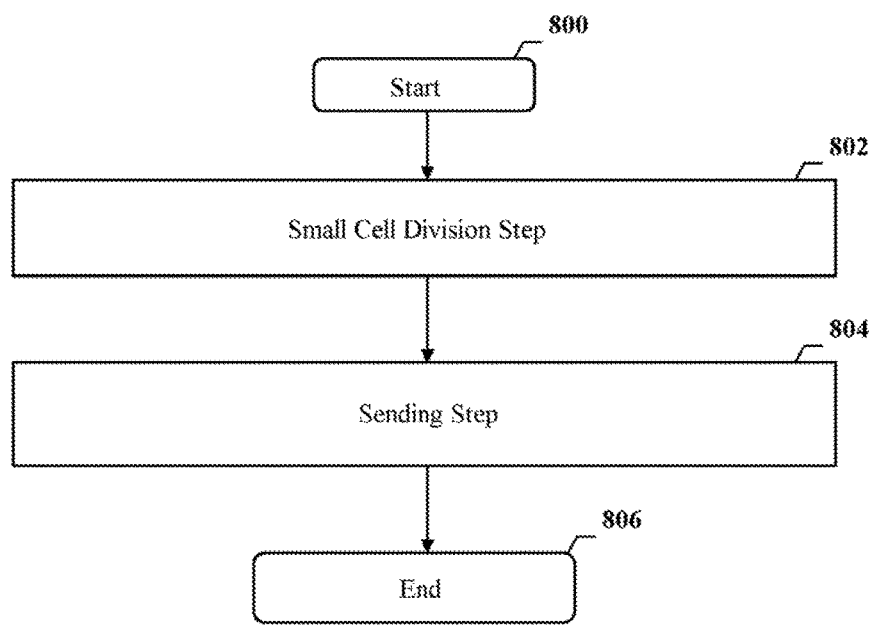
FIG. 8 is a flow chart illustrating a method used in a wireless communication system according to another embodiment of the present invention.

A method used in a wireless communication system according to another embodiment of the present invention is described below with reference to FIG. 8. FIG. 8 is a flow chart illustrating a method used in a wireless communication system according to another embodiment of the present invention.

As shown in FIG. 8, the method starts at step 800. The method proceeds to step 802 after step 800.

Step 802 is a small cell division step. In step 802, small cells adjacent to each other can be divided into small cell clusters, and information of small cell clusters indicating which small cells are adjacent to each others is formed.

The method proceeds to step 804 after step 802.

Step 804 is a sending step. In step 804, the information of small cell clusters can be sent to a mobile terminal, where the information of small cell clusters is used by the mobile terminal to evaluate the denseness of small cells within a region in which the mobile terminal locates.

Then, the method ends at step 806.

The method shown in FIG. 8 is a method corresponding to the device shown in FIG. 7, the specific details of which are omitted here.

Figure 9:
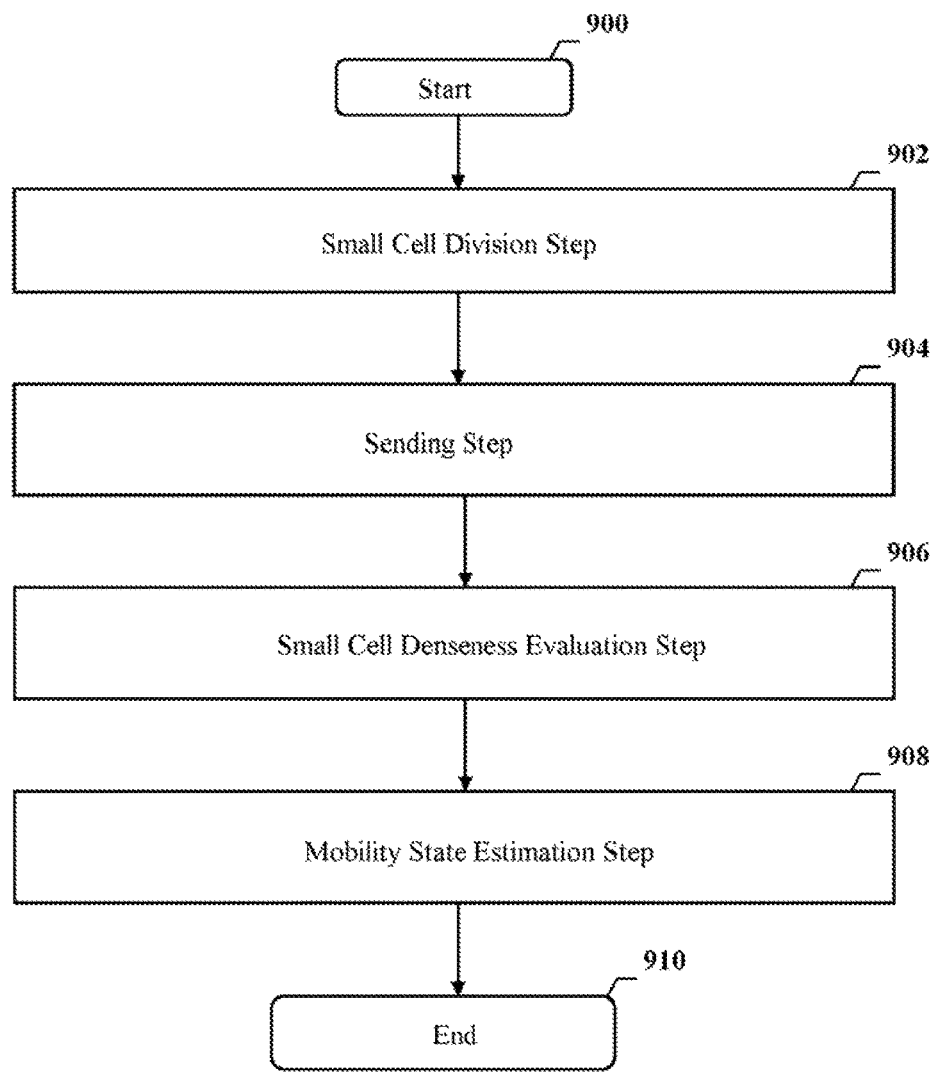
FIG. 9 is a flow chart illustrating a method used in a wireless communication system according to another embodiment of the present invention.

A method used in a wireless communication system according to another embodiment of the present invention is described below with reference to FIG. 9. FIG. 9 is a flow chart illustrating a method used in a wireless communication system according to another embodiment of the present invention.

As shown in FIG. 9, the method starts at step 900. The method proceeds to step 902 after step 900.

Step 902 is a small cell division step. In step 902, a base station apparatus may divide small cells adjacent to each other into small cell clusters, and form information of small cell clusters indicating which small cells are adjacent to each others.

The method proceeds to step 904 after step 902.

Step 904 is a sending step. In step 904, the base station apparatus may send the information of small cell clusters to a mobile terminal apparatus.

The method proceeds to step 906 after step 904.

The step 906 is a small cell denseness evaluation step. In step 906, the mobile terminal apparatus may evaluate the denseness of small cells within a region in which the mobile terminal apparatus locates according to the information of small cell clusters received from the base station apparatus.

The method proceeds to step 908 after step 906.

The step 908 is a mobility state estimation step. In step 908, the mobile terminal apparatus may determine a mobility state estimation manner according to the evaluated denseness of the small cells so as to estimate mobility state of the mobile terminal apparatus.

Then, the method ends at step 910.

Specific embodiment examples of the present application are given below in detail.

The following specific embodiment examples are exemplary only, and not limiting.

Embodiment Example I

After a mobile terminal is connected to a network, the denseness of small cells within a region in which the mobile terminal locates is to be determined.

When a base station-assisted determination method is used, if the information of small cell clusters is broadcast by a macro base station, the specific steps for determining the denseness of small cells are as follows:

(1) After connecting to a macro base station, the mobile terminal obtains the information of small cell clusters within the region in which the mobile terminal locates according to the system information broadcast by the macro base station;

(2) When the mobile terminal is close to the coverage of a particular small cell, the physical cell identifier of the small cell is matched with the information of small cell clusters broadcast by the macro base station; and (3) The denseness of the small cells within the region in which the mobile terminal currently locates is determined according to the number of small cells contained in the information of small cell clusters.

When a base station-assisted determination method is used, if the information of small cell clusters is broadcast by a small cell base station, the specific steps for determining the denseness of small cells are as follows:

(1) after switching from a macro cell to a particular small cell, the mobile terminal demodulates the system information broadcast by the small cell, the system information including the information of small cell cluster for the small cell cluster to which the small cell belongs; and (2) the mobile terminal demodulates the information of small cell cluster, and determines the denseness of the small cells within the region in which the mobile terminal currently locates according to the number of small cells included in the information of small cell cluster.

When a determination method based on the count of number of times of small cell switching is used, the specific steps for determining the denseness of small cells are as follows:

(1) the mobile terminal identifies the types of the source cell and the target cell;

(2) the mobile terminal counts the number of times that it switches or reselects to a small cell, incrementing the counter by one when the mobile terminal successfully switches or reselects to a small cell;

(3) the mobile terminal compares the counting result with a plurality of predetermined thresholds which have been set, and determines the denseness of the small cells within the region in which the mobile terminal currently locates according to the comparison result; and (4) when the mobile terminal switches or reselects to another macro cell, the counter is cleared.

When a determination method with the assistance of the positional information of the cell base station is used, the specific steps for determining the denseness of small cells are as follows:

(1) the mobile terminal identifies the types of the source cell and the target cell, and records a plurality of small cells that the mobile terminal is recently successfully connected to;

(2) the mobile terminal deduces the transmission power of the cell base station, and estimates the coverage of the cell base station according to the transmission power of the cell base station; the mobile terminal determines whether two of the small cells that the mobile terminal is successfully connected to are close to each other according to position information of the cell base station and the estimated coverage of the cell base station; and (3) if the mobile terminal determines that the plurality of small cells which it is connected to are all close to one another, it is determined that the denseness of the small cells within the region in which the mobile terminal currently locates is high.

Embodiment Example II

After determining the denseness of small cells, the mobile terminal may determine a mobility state estimation manner for the mobile terminal according to the denseness of the small cells within a region in which the mobile terminal locates, and the specific steps are as follows:

(1) If the denseness of the small cells within a region in which the mobile terminal locates is low, the mobile terminal identifies the types of the source cell and the target cell;

(2) within a predetermined time window, the mobile terminal counts the number of times that it switches to a macro cell, and performs mobility state estimation for the mobile terminal according to the counting result;

(3) upon entering a region where small cells are densely deployed, the mobile terminal obtains and records position information of the small cell that the mobile terminal is connected to, estimates a movement distance of the mobile terminal in conjunction with the position information of the latest recorded small cell, and compares an accumulative movement distance with a plurality of predetermined thresholds which have been set, so as to perform mobility state estimation for the mobile terminal; and (4) after the mobile terminal returns to a region where small cells are not densely deployed, the mobility state evaluation manner may be switched back to the method based on the count of number of times of switching between macro cells.

Embodiment Example III

Embodiment example III differs from Embodiment example II in that, the mobile terminal does not need to switch the mobility state estimation manner according to the denseness of the small cells; instead, different weight factor configurations are set according to different scenarios. The specific steps are as follows:

(1) When in a region where small cells are not densely deployed, the mobile terminal identifies the types of the source cell and the target cell;

(2) within a predetermined time window, the mobile terminal performs cell weight factor-based counting of the number of times that the mobile terminal switches or reselects successfully between macro cells and the number of time that the mobile terminal receives services from a small cell, with small cells and macro cells assigned with different cell weight factors, and performs mobility state estimation according to the counting result; and (3) upon entering a region where small cells are densely deployed, the mobile terminal selects another set of cell weight factors according to the denseness of the small cells so that the cell weight factors for small cells are appropriately increased while the cell weight factors for the macro cells are accordingly decreased, performs cell weight factor-based counting of the number of times that the mobile terminal successfully switches or reselects between macro cells and the number of time that the mobile terminal receives services from a small cell with the adjusted cell weight factors, and performs mobility state estimation according to the counting result.

Embodiment Example IV

The mobile terminal is located in a high-rise office building, each floor of the office building being covered by a small cell.

(1) The mobile terminal moves between different floors of the office building, which causes the mobile terminal to encounter cell switching or reselection multiple times in a short period due to the presence of the coverage of the plurality of small cells in the office building.

(2) If the mobility state estimation manner based on the count of number of times of cell switching or reselection is used, the mobile terminal would be classified as a medium-to-high speed mobile terminal based on the mobility state estimation result. Hence, by a mobility management strategy according to the present invention, the mobile terminal of such a kind would not be switched to a small cell.

(3) However, when the mobile terminal enters a small cell cluster, the number of times that the mobile terminal obtains services from a small cell within the small cell cluster starts to be accumulated, adding one to the value of the counter each time the mobile terminal successfully obtains small cell services from a new small cell.

(4) If the mobile terminal leaves the first small cell cluster or enters another new small cell cluster, the counter is cleared; or, the result from the latest counting for the small cell cluster is stored for a predetermined period of time, and the accumulating result of the number of times that the mobile terminal obtains small cell services within the first small cell cluster is continuously used when the mobile terminal switches back to the first small cell cluster within the predetermined period of time.

(5) If the mobile terminal encounters multiple consecutive switching failures, the accumulating result of the number of times that the mobile terminal obtains small cell services within the small cell cluster will be cleared.

(6) However, in the above scenario, the accumulating result of the number of times that the mobile terminal obtains small cell services within the small cell cluster exceeds the predetermined threshold, which shows that the mobile terminal successfully obtains services from the small cells multiple times in the region where the small cells are densely deployed, hence the mobile terminal being capable of obtaining services from the small cells. Therefore, although it appears according to the mobility state estimation result that the mobile terminal cannot obtain services from the small cells, based on the accumulating result of the number of times that the mobile terminal obtains small cell services within the small cell cluster, it can be determined that the mobile terminal can obtain services from the small cells, regardless of any other determination criterion for determining whether the mobile terminal can obtain services from the small cells, e.g. the mobility state estimation result.

Embodiment Example V

Initially, the mobile terminal is not powered on. The following specific steps implement a switching strategy:

(1) The mobile terminal is powered on, and then connected to the network after initial synchronization, random access and resource allocation.

(2) The mobile terminal establishes a RRC connection with the network, and is in a RRC connected state when a business is currently transmitted, or in a RRC idle state when no business is transmitted.

(3) The mobile terminal identifies the type of the current cell, e.g., by deducting from the transmission power of the cell base station, or by querying a cell level identifier of the cell, or the like.

(4) The mobile terminal determines whether it is in a region where small cells are densely deployed.

(5) The mobile terminal determines a mobility state estimation manner for the mobile terminal according to the denseness of the small cells in the region where mobile terminal locates.

(6) Cell reselection occurs when the mobile terminal is in a RRC idle state; cell switching occurs when the mobile terminal is in a RRC connected state. When the quality of service of the current cell degrades to a degree such that a preconfigured event triggering condition is met, the process of cell reselection or cell switching is triggered, at which time the mobile terminal performs a corresponding strategy according to the specific circumstances to ensure the mobility performance of the mobile terminal.

(7) When the mobile terminal is in a RRC idle state, if it is detected that the mobile terminal is located in a region where small cells are densely deployed, the mobile terminal in the idle state is prevented from performing cell search and/or cell measurement for the small cells; if it is detected that the mobile terminal is located in a region where small cells are not densely deployed, the mobile terminal in the idle state is allowed to perform the cell search and/or cell measurement for the small cells.

(8) The mobile terminal divides the businesses at the mobile terminal into a business type of high time delay sensitivity and a business type of low time delay sensitivity according to the sensitivity of the businesses at the mobile terminal.

(9) The mobile terminal filters switchable target cells for the mobile terminal in the connected state according to the mobility state estimation result and the business type at the mobile terminal, and performs cell measurement and/or measurement report for the filtered target cells to perform cell switching for the mobile terminal, thereby reducing unnecessary measurement so that cell switching can be more purposeful.

Moreover, an embodiment of the present invention provides a program product, the program product carrying machine-executable instructions which causes an information processing device to execute the method used in a wireless communication system according to an embodiment of the present invention as described above when executed on the information processing device.

In addition, an embodiment of the present invention further provides a storage medium, the storage medium including machine-readable program codes which cause an information processing device to execute the method used in a wireless communication system according to an embodiment of the present invention as described above when executed on the information processing device.

Accordingly, the storage medium for carrying a program product on which the machine-readable instruction codes are stored is also included in the disclosure of the present invention. The storage medium includes, but is not limited to, a floppy disk, a magnetic disk, a magneto-optical disk, a memory card and a memory stick.

The device in a wireless communication system and its components according to the embodiments of the present invention can be implemented with software, firmware, hardware or any combination thereof. The specific implementations for the configuration are known to those skilled in the art and therefore omitted. In the case where the present invention is implemented with software or firmware, a program constituting the software may be installed into an information processing device (e.g., the information processing device 1000 in FIG. 10) with a dedicated hardware structure from a storage medium or a network, and the computer is capable of performing various functions when installed with various programs.

Figure 10:
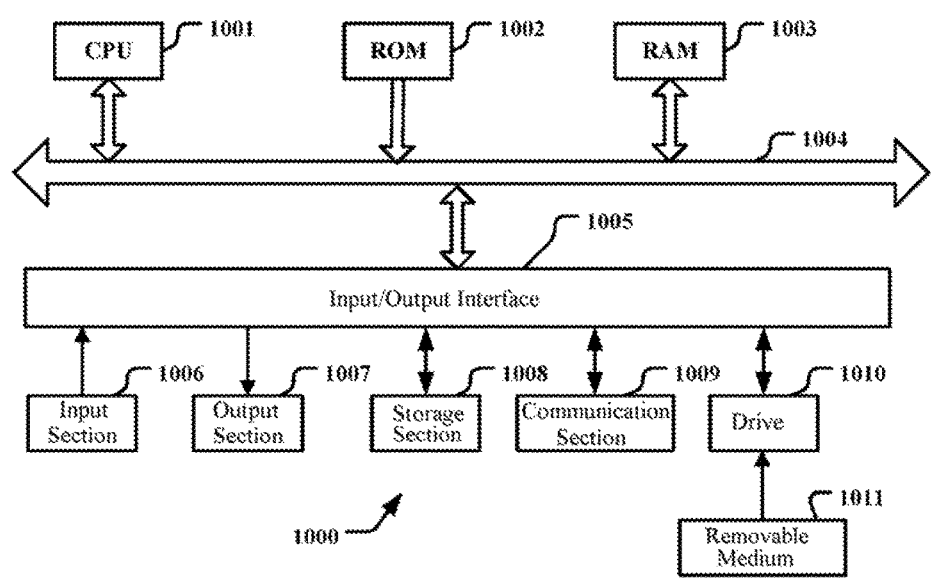
FIG. 10 is an illustrative block diagram illustrating an information processing apparatus on which the embodiments of the present invention can be implemented.

FIG. 10 is an exemplary block diagram illustrating an information processing apparatus on which the embodiments of the present invention can be implemented.

In FIG. 10, a Central Processing Unit (CPU) 1001 performs various processes based on a program stored in a Read Only Memory (ROM) 1002 or a program loaded from a storage section 1008 to a Random Access Memory (RAM) 1003. In the RAM 1003, data for the CPU 1001 to perform the various processes or the like is also stored as needed. The CPU 1001, the ROM 1002, and the RAM 1003 are connected to one another via a bus 1004. An input/output interface 1005 is also connected to the bus 1004.

To the input/output interface 1005 are connected: an input section 1006 (including a keyboard, a mouse, and the like); an output section 1007 (including a display such as a Cathode Ray Tube (CRT), a Liquid Crystal Display (LCD), and the like, and a loudspeaker and the like); the storage section 1008 (including a hard disk and the like); and a communication section 1009 (including a network interface card such as a LAN card, a modem, and the like). The communication section 1009 performs communication processes via a network such as the Internet. A drive 1010 may also be connected to the input/output interface 1005 as needed. A removable medium 1011, such as a magnetic disk, an optical disc, a magneto-optical disk, a semiconductor memory and the like, may be loaded onto the drive 1010 as needed, so that the computer program read therefrom can be installed into the storage section 1008 as needed.

In the case where the above-described series of processes is implemented with software, the program that constitutes the software can be installed from a network such as the Internet or a storage medium such as the removable medium 1011.

Those skilled in the art would appreciate that, the storage medium is not limited to the removable medium 1011 as illustrated in FIG. 10 which has the program stored therein and is distributed separately from the device for providing the program to the user. Examples of the removable medium 1011 include a magnetic disk (including a floppy disk (registered trademark)), an optical disc (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 1002, the hard disk contained in the storage section 1008, or the like, which has the program stored therein and is distributed to the user together with the device containing it.

When read and executed by a machine, the instruction codes execute the method used in a wireless communication system according to an embodiment of the present invention.

Apparently, various modifications and alternatives can be made by those skilled in the art without deviation from the scope and spirit of the present invention. The embodiments are selected and described for illustrating the principle and the practical application of the present invention in a best way, so that those skilled in the art would appreciate that the present invention may adopt various implementations with various modifications suitable for a particular application as desired.

According to an embodiment of the present invention, it is provided a device in a wireless communication system, the device including: a small cell denseness evaluation unit configured to evaluate denseness of small cells within a region in which a mobile terminal locates; and a mobility state estimation unit configured to determine a mobility state estimation manner according to the evaluated denseness of the small cells so as to estimate mobility state of the mobile terminal.

According to the above device, the small cell denseness evaluation unit is further configured to receive information of small cell clusters indicating which small cells are adjacent to each other from a base station serving the mobile terminal and evaluate the denseness of the small cells within the region in which the mobile terminal locates in accordance with the information of small cell clusters.

According to the above device, the information of small cell clusters is indicated by information of small cell identifier indexes added in a list of adjacent cells, the information of the small cell identifier indexes including information of small cell identifiers of adjacent small cells to indicate that these adjacent small cells belong to a same cluster.

According to the above device, the small cell denseness evaluation unit is further configured to evaluate the denseness of the small cells within the region in which the mobile terminal locates according to a history that the mobile terminal obtains services from the small cells.

According to the above device, the small cell denseness evaluation unit is configured to determine whether a type of a target cell from which the mobile terminal obtains services is a small cell and count number of times that the target cell from which the mobile terminal obtains services is the small cell within a predetermined time, and to evaluate the denseness of the small cells within the region in which the mobile terminal locates by comparing the number of times with a predetermined threshold of number of times.

According to the above device, the small cell denseness evaluation unit is configured to determine whether a type of a target cell from which the mobile terminal obtains services is a small cell and determine distances between small cells from which the mobile terminal obtains services according to position information of the small cells from which the mobile terminal obtain services, and to evaluate the denseness of the small cells within the region in which the mobile terminal locates by comparing the distances with a predetermined distance threshold.

According to the above device, the predetermined distance threshold is determined according to coverage of the small cells from which the mobile terminal obtains services.

According to the above device, the small cell denseness evaluation unit is further configured to determine a type and/or coverage of a target cell from which the mobile terminal obtain services according to a transmission power of the target cell.

According to the above device, the small cell denseness evaluation unit is further configured to receive information of cell type indicating a cell type from a base station serving the mobile terminal and to determine type of the target cell according to the information of cell type.

According to the above device, if the evaluated denseness of the small cells is low, the mobility state estimation unit is further configured to count only number of times that the mobile terminal switches or reselects among macro cells and estimate the mobility state of the mobile terminal according to the number of times that the mobile terminal switches or reselects among the macro cells.

According to the above device, if the evaluated denseness of the small cells is high, the mobility state estimation unit is further configured to estimate a movement distance of the mobile terminal according to position information of small cells from which the mobile terminal obtains services and to estimate the mobility state of the mobile terminal according to the movement distance of the mobile terminal.

According to the above device, the mobility state estimation unit is further configured to count number of times that the mobile terminal switches or reselects among macro cells and number of times that the mobile terminal obtains services from the small cells respectively, and to estimate the mobility state of the mobile terminal according to a weighted sum of the number of times that the mobile terminal switches or reselects among the macro cells and the number of times that the mobile terminal obtains services from the small cells, wherein cell weight factors of the small cells and the macro cells are adjusted adaptively according to the evaluated denseness of the small cells to calculate the weighted sum.

According to the above device, the mobility state estimation unit is further configured to accumulate number of times that the mobile terminal obtains services from the small cells in a unit of a predetermined area, and to determine that the mobile terminal is able to obtain services from the small cells within the predetermined area if a result of the accumulating is larger than a predetermined count threshold.

According to the above device, the mobile terminal is able to obtain services from the small cells in at least one manner of switching or reselecting to small cells, and carrier aggregation, double-connection and coordinated multiple point transmission through small cells.

According to the above device, the mobility state estimation unit is further configured to accumulate the number of times that the mobile terminal obtains services from the small cells in the unit of a small cell cluster, and when the mobile terminal switches from a first small cell cluster to another small cell cluster, clear the accumulating result of the number of times that the mobile terminal obtains services from small cells in the first small cell cluster to restart counting; or store the accumulating result for a predetermined period of time and continue using the stored accumulating result of the number of times that the mobile terminal obtains services from small cells in the first small cell cluster if the mobile terminal switches back to the first small cell cluster within the predetermined period of time.

According to the above device, whether the mobile terminal switches to another small cell cluster is determined according to the information of small cell clusters indicating which small cells are adjacent to each other.

According to the above device, the distance between the two small cells that the mobile terminal switches from and to is determined according to position information of the small cells, and whether the mobile terminal switches to another small cell cluster is determined according the determined distance between the two small cells.

According to the above device, when the mobile terminal encounters multiple consecutive switching failures or encounters multiple switching failures in a predetermined period of time, the accumulating result of the number of times that the mobile terminal obtains services from small cells in the small cell cluster is cleared to restart counting.

According to the above device, a mobility management unit is further included, and is configured to control cell reselection for the mobile terminal in a free state according to the evaluated denseness of the small cells, and/or to control cell switching for the mobile terminal in a connected state according to the estimated result of the mobility state.

According to the above device, the mobility management unit is further configured to prevent the mobile terminal in the free state from performing cell search and/or cell measurement for the small cells in a case that the evaluated denseness of the small cells is high, and to allow the mobile terminal in the free state to perform the cell search and/or cell measurement for the small cells in a case that the evaluated denseness of the small cells is low.

According to the above device, if the evaluated denseness of the small cells is high, the mobility management unit is further configured to allow the mobile terminal in the free state to perform cell search and/or cell measurement for the small cells if service quality of macro cells is lower than a first predetermined threshold or a difference between service quality of the small cells and the service quality of the macro cells is larger than a second predetermined threshold.

According to the above device, a business type division unit is further included, and is configured to divide businesses at the mobile terminal into different business types according to time delay sensitivity of the businesses at the mobile terminal, and the mobility management unit is further configured to filter switchable target cells for the mobile terminal in the connected state according to the estimated result of the mobility state of the mobile terminal and the business type and to perform cell measurement and/or measurement report for the filtered target cells to perform cell switching for the mobile terminal.

According to the above device, if at least one of a plurality of businesses in a connected state at the mobile terminal has a high time delay sensitivity, the business type division unit is further configured to determine a collective time delay sensitivity of the businesses at the mobile terminal to be high.

According to another embodiment of the present invention, it is provided a method in a wireless communication system, the method including: a small cell denseness evaluation step of evaluating denseness of small cells within a region in which a mobile terminal locates; and a mobility state estimation step of determining a mobility state estimation manner according to the evaluated denseness of the small cells so as to estimate mobility state of the mobile terminal.

According to the above method, in the small cell denseness evaluation step, the denseness of the small cells within the region in which the mobile terminal locates is evaluated according to a history that the mobile terminal obtains services from the small cells.

According to the above method, in the small cell denseness evaluation step, whether a type of a target cell from which the mobile terminal obtains services is a small cell is determined, and number of times that the target cell from which the mobile terminal obtains services is the small cell within a predetermined time is counted, and the denseness of the small cells within the region in which the mobile terminal locates is evaluated by comparing the number of times with a predetermined threshold of number of times.

According to the above method, in the small cell denseness evaluation step, whether a type of a target cell from which the mobile terminal obtains services is a small cell is determined, and distances between small cells from which the mobile terminal obtains services are determined according to position information of the small cells from which the mobile terminal obtain services, and the denseness of the small cells within the region in which the mobile terminal locates is evaluated by comparing the distances with a predetermined distance threshold.

According to the above method, in the mobility state estimation step, if the evaluated denseness of the small cells is low, only number of times that the mobile terminal switches or reselects among macro cells is counted, and the mobility state of the mobile terminal is estimated according to the number of times that the mobile terminal switches or reselects among the macro cells.

According to the above method, in the mobility state estimation step, if the evaluated denseness of the small cells is high, a movement distance of the mobile terminal is estimated according to position information of small cells from which the mobile terminal obtains services, and the mobility state of the mobile terminal is estimated according to the movement distance of the mobile terminal.

According to the above method, a mobility management step is further included, for controlling cell reselection for the mobile terminal in a free state according to the evaluated denseness of the small cells, and/or controlling cell switching for the mobile terminal in a connected state according to the estimated result of the mobility state.

According to another embodiment of the present invention, it is provided a device in a wireless communication system, the device including: a small cell division unit configured to divide small cells adjacent to each other into small cell clusters and form information of small cell clusters indicating which small cells are adjacent to each other; and a sending unit configured to send the information of small cell clusters to a mobile terminal, wherein the information of small cell clusters is used by the mobile terminal to evaluate denseness of small cells within a region in which the mobile terminal locates.

According to the above device, the information of small cell clusters is indicated by information of small cell identifier indexes added in a list of adjacent cells, the information of small cell identifier indexes including information of small cell identifiers of adjacent small cells to indicate that these adjacent small cells belong to a same cluster.

According to the above device, the sending unit is further configured to send position information of the small cells and/or parameter information related to coverage of the small cells to the mobile terminal.

According to the above device, the parameter information related to coverage of the small cells includes information of transmission power of the small cells.

According to yet another embodiment of the present invention, it is provided a method in a wireless communication system, the method including: a small cell division step of dividing small cells adjacent to each other into small cell clusters and forming information of small cell clusters indicating which small cells are adjacent to each other; and a sending step of sending the information of small cell clusters to a mobile terminal, wherein the information of small cell clusters is used by the mobile terminal to evaluate denseness of small cells within a region in which the mobile terminal locates.

According to yet another embodiment of the present invention, it is provided a method in a wireless communication system, the method including: a small cell division step of a base station apparatus dividing small cells adjacent to each other into small cell clusters and forming information of small cell clusters indicating which small cells are adjacent to each other; a sending step of the base station apparatus sending the information of small cell clusters to a mobile terminal apparatus; a small cell denseness evaluation step of the mobile terminal apparatus evaluating denseness of small cells within a region in which the mobile terminal apparatus locates according to the information of small cell clusters received from the base station apparatus; and a mobility state estimation step of the mobile terminal apparatus determining a mobility state estimation manner according to the evaluated denseness of the small cells so as to estimate mobility state of the mobile terminal apparatus.

According to the above method, the information of small cell clusters is indicated by information of small cell identifier indexes added in a list of adjacent cells, the information of small cell identifier indexes including information of small cell identifiers of adjacent small cells to indicate that these adjacent small cells belong to a same cluster.

According to yet another embodiment of the present invention, it is provided a computer storage medium including computer-readable instructions, the computer instructions causing a computer to execute: a small cell denseness evaluation step of evaluating denseness of small cells within a region in which a mobile terminal locates; and a mobility state estimation step of determining a mobility state estimation manner according to the evaluated denseness of the small cells so as to estimate mobility state of the mobile terminal.

According to yet another embodiment of the present invention, it is provided a computer storage medium including computer-readable instructions, the computer instructions causing a computer to execute: a small cell division step of dividing small cells adjacent to each other into small cell clusters and forming information of small cell clusters indicating which small cells are adjacent to each other; and a sending step of sending the information of small cell clusters to a mobile terminal, wherein the information of small cell clusters is used by the mobile terminal to evaluate denseness of small cells within a region in which the mobile terminal locates.

According to yet another embodiment of the present invention, it is provided a computer storage medium including computer-readable instructions, the computer instructions causing a computer to execute: a small cell division step of a base station apparatus dividing small cells adjacent to each other into small cell clusters and forming information of small cell clusters indicating which small cells are adjacent to each other; a sending step of the base station apparatus sending the information of small cell clusters to a mobile terminal apparatus; a small cell denseness evaluation step of the mobile terminal apparatus evaluating denseness of small cells within a region in which the mobile terminal apparatus locates according to the information of small cell clusters received from the base station apparatus; and a mobility state estimation step of the mobile terminal apparatus determining a mobility state estimation manner according to the evaluated denseness of the small cells so as to estimate mobility state of the mobile terminal apparatus.

According to an embodiment of the present invention, it is provided a system including: circuitry configured to determine a cell density and cell type in an area corresponding to a location of a user equipment; determine a mobility state of the user equipment based on the determined cell density and the determined cell type; and control cell reselection for the user equipment based on the determined mobility state of the user equipment.

According to the above system, the cell type includes at least a first cell type corresponding to a macro cell and a second cell type corresponding to a small cell having a smaller coverage area than the macro cell.

According to the above system, the circuitry is configured to receive, from a cell serving the user equipment, information indicating the cell density.

According to the above system, the circuitry is configured to receive, from a cell serving the user equipment, information identifying a plurality of small cells existing in a small cell cluster.

According to the above system, the circuitry is configured to determine the cell density by comparing an identifier received from a cell serving the user equipment with information associating the identifier with the cell density.

According to the above system, the circuitry is configured to receive, from a cell serving the user equipment, information identifying a cluster of small cells.

According to the above system, the circuitry is configured determine the cell density by counting a number of times that the user equipment obtains service from cells within a predetermined period of time, the service including at least one of a connection to a small cell and a simultaneous connection to a plurality of cells including a small cell.

According to the above system, the circuitry is configured to determine the cell density to be high when the counted number of times exceeds a predetermined threshold value.

According to the above system, the circuitry is configured to determine the cell density by determining a distance between cells from which the system obtains service.

According to the above system, the circuitry is configured to determine at least one of the cell density and cell type based on a transmission power of a cell servicing the user equipment.

According to the above system, the circuitry is configured to determine the cell type based on an identifier corresponding to a base station included in a signal received in the cell servicing the system.

According to the above system, the circuitry is configured to determine the mobility state of the user equipment by counting a number of times that the user equipment receives service from macro cells when it is determined that the cell density is low.

According to the above system, the circuitry is configured to estimate the mobility state of the user equipment by estimating a movement distance of the user equipment when it is determined that the cell density is high.

According to the above system, the circuitry is configured to estimate the mobility state of the user equipment according a difference in position information corresponding to each of a plurality of small cells from which the user equipment receives services.

According to the above system, the circuitry is configured to determine a first number of times that the user equipment receives service from macro cells and a second number of times that the user equipment receives service from small cells.

According to the above system, the circuitry is configured to: set a first and second weight according to the determined cell density; apply the first weight to the first number; apply the second weight to the second number; determine a sum of the weighted first number and the weighted second number; and determine the mobility state of the user equipment based on the sum of the weighted first number and the weighted second number.

According to the above system, the circuitry is configured to: count a number of times that the user equipment receives service from small cells in a predetermined area; compare the counted number of times to a predetermined threshold value; and restart the counting when the counted number of times exceeds the predetermined threshold value or if the user equipment moves from the area.

According to the above system, the circuitry is configured to: control transmitting information indicating the mobility state of the user equipment to a base station; and receive, from the base station, a handover target based on the transmitted information indicating the mobility state of the user equipment.

According to the above system, the system is the user equipment.

According to yet another embodiment of the present invention, it is provided a non-transitory computer-readable medium including computer-readable instructions, which when executed by a system, cause the system to: determine a cell density and cell type in an area corresponding to a location of a user equipment; determine a mobility state of the user equipment based on the determined cell density and the determined cell type; and control cell reselection for the user equipment based on the determined mobility state of the user equipment.

According to yet another embodiment of the present invention, it is provided a method performed by a system, the method comprising: determining, by circuitry of the system, a cell density and cell type in an area corresponding to a location of a user equipment; determining, by the circuitry, a mobility state of the user equipment based on the determined cell density and the determined cell type; and controlling, by the circuitry, cell reselection for the user equipment based on the determined mobility state of the user equipment.

The invention claimed is:

1. A system comprising:
    circuitry configured to
        determine a cell density based on a number of cells in an area corresponding to a location of a user equipment;
        determine cell types for the cells in the area corresponding to the location of the user equipment, the cell type being determined at least by an identifier in a system information block;
        determine a mobility state of the user equipment based on the determined cell density, the determined cell types, and when it is determined that the cell density is high, an estimated movement distance of the user equipment; and
        control cell reselection for the user equipment based on the determined mobility state of the user equipment,
        wherein the cell types include at least a first cell type corresponding to a macro cell and a second cell type corresponding to a small cell having a smaller coverage area than the macro cell.

2. The system of claim 1, wherein the circuitry is configured to receive, from a cell serving the user equipment, information indicating the cell density.

3. The system of claim 1, wherein the circuitry is configured to receive, from a cell serving the user equipment, information identifying a plurality of small cells existing in a small cell cluster.

4. The system of claim 1, wherein the circuitry is configured to determine the cell density by comparing an identifier received from a cell serving the user equipment with information associating the identifier with the cell density.

5. The system of claim 1, wherein the circuitry is configured to receive, from a cell serving the user equipment, information identifying a cluster of small cells.

6. The system of claim 1, wherein the circuitry is configured determine the cell density by counting a number of times that the user equipment obtains service from cells within a predetermined period of time, the service including at least one of a connection to a small cell and a simultaneous connection to a plurality of cells including a small cell.

7. The system of claim 6, wherein the circuitry is configured to determine the cell density to be high when the counted number of times exceeds a predetermined threshold value.

8. The system of claim 1, wherein the circuitry is configured to determine the cell density by determining a distance between cells from which the system obtains service.

9. The system of claim 1, wherein the circuitry is configured to determine at least one of the cell density and cell types based on a transmission power of a cell servicing the user equipment.

10. The system of claim 1, wherein the circuitry is configured to determine the cell types based on an identifier corresponding to a base station included in a signal received in the cell servicing the system.

11. The system of claim 1, wherein the circuitry is configured to determine the mobility state of the user equipment by counting a number of times that the user equipment receives service from macro cells when it is determined that the cell density is low.

12. The system of claim 1, wherein the circuitry is configured to estimate the mobility state of the user equipment according a difference in position information corresponding to each of a plurality of small cells from which the user equipment receives services.

13. The system of claim 1, wherein the circuitry is configured to determine a first number of times that the user equipment receives service from macro cells and a second number of times that the user equipment receives service from small cells.

14. The system of claim 13, wherein the circuitry is configured to:
    set a first and second weight according to the determined cell density;
    apply the first weight to the first number;
    apply the second weight to the second number;
    determine a sum of the weighted first number and the weighted second number; and
    determine the mobility state of the user equipment based on the sum of the weighted first number and the weighted second number.

15. The system of claim 1, wherein the circuitry is configured to:
    count a number of times that the user equipment receives service from small cells in a predetermined area;
    compare the counted number of times to a predetermined threshold value; and
    restart the counting when the counted number of times exceeds the predetermined threshold value or if the user equipment moves from the area.

16. The system of claim 1, wherein the circuitry is configured to:
    control transmitting information indicating the mobility state of the user equipment to a base station; and
    receive, from the base station, a handover target based on the transmitted information indicating the mobility state of the user equipment.

17. The system of claim 1, wherein the system is the user equipment.

* * * * *